US011302082B2

(12) United States Patent
Martin

(10) Patent No.: US 11,302,082 B2
(45) Date of Patent: Apr. 12, 2022

(54) MEDIA TAGS—LOCATION-ANCHORED DIGITAL MEDIA FOR AUGMENTED REALITY AND VIRTUAL REALITY ENVIRONMENTS

(71) Applicant: TagSpace Pty Ltd, Sydney (AU)

(72) Inventor: Paul Simon Martin, Sydney (AU)

(73) Assignee: tagSpace Pty Ltd, Bondi Beach (AU)

( * ) Notice: Subject to any disclaimer, the term of this patent is extended or adjusted under 35 U.S.C. 154(b) by 0 days.

(21) Appl. No.: 16/932,022

(22) Filed: Jul. 17, 2020

(65) Prior Publication Data

US 2020/0349774 A1 Nov. 5, 2020

Related U.S. Application Data

(63) Continuation of application No. 15/600,446, filed on May 19, 2017, now abandoned.
(Continued)

(51) Int. Cl.
*G06T 19/00* (2011.01)
*G01S 19/14* (2010.01)
(Continued)

(52) U.S. Cl.
CPC ............ *G06T 19/006* (2013.01); *G01S 19/14* (2013.01); *G02B 27/0101* (2013.01);
(Continued)

(58) Field of Classification Search
CPC ..... G06T 19/006; G06T 7/70; G06T 2200/04; G06T 2219/2004; G01S 19/14;
(Continued)

(56) References Cited

U.S. PATENT DOCUMENTS 8,238,671 B1 8/2012 Babenko et al.
8,649,803 B1 2/2014 Hamill
(Continued)

FOREIGN PATENT DOCUMENTS

WO WO 2017/201568 A1 11/2017
WO WO 2017/201569 A1 11/2017
(Continued)

OTHER PUBLICATIONS

"Axes conventions", Wikipedia [online], [retrieved on Sep. 13, 2017], Retrieved from the Internet: <https://en.wikipedia.org/Wiki/Axes_conventions>, 5 pages.
(Continued)

*Primary Examiner* — Maurice L. McDowell, Jr.
(74) *Attorney, Agent, or Firm* — Fenwick & West LLP

(57) ABSTRACT

Provided herein are exemplary embodiments directed to a method for creating digital media, including the placing the digital media in a computer graphics environment, the computer graphics environment further comprising visually perceptible elements appearing as real objects placed in a real world setting, and viewing the digital media when at the real world setting. Various exemplary systems include an augmented reality and virtual reality server connected to a network, and a client device connected to the network, the client device having an augmented reality and virtual reality application. Further exemplary systems include a body or motion sensor connected to the client device and/or an augmented reality and virtual reality interface connected to the client device.

19 Claims, 22 Drawing Sheets

Related U.S. Application Data

(60) Provisional application No. 62/340,118, filed on May 23, 2016, provisional application No. 62/340,110, filed on May 23, 2016.

(51) Int. Cl.

| | | |
|---|---|---|
| *G06F 3/01* | (2006.01) | |
| *G02B 27/01* | (2006.01) | |
| *G01S 19/40* | (2010.01) | |
| *G01S 19/39* | (2010.01) | |
| *G06T 7/70* | (2017.01) | |
| *G01S 19/52* | (2010.01) | |
| *G01S 19/53* | (2010.01) | |
| *G02B 27/00* | (2006.01) | |
| *G09G 3/00* | (2006.01) | |

(52) U.S. Cl.
CPC ............ *G06F 3/011* (2013.01); *G01S 19/396* (2019.08); *G01S 19/40* (2013.01); *G01S 19/52* (2013.01); *G01S 19/53* (2013.01); *G02B 27/0093* (2013.01); *G02B 27/017* (2013.01); *G06T 7/70* (2017.01); *G06T 2200/04* (2013.01); *G06T 2219/2004* (2013.01); *G09G 3/003* (2013.01)

(58) Field of Classification Search
CPC ........ G01S 19/396; G01S 19/40; G01S 19/52; G01S 19/53; G06F 3/011; G02B 27/0101; G02B 27/0093; G02B 27/017; G09G 3/003
See application file for complete search history.

(56) References Cited

U.S. PATENT DOCUMENTS

| | | | |
|---|---|---|---|
| 8,908,043 | B2 | 12/2014 | Tricoukes et al. |
| 9,298,283 | B1 | 3/2016 | Lin et al. |
| 9,542,778 | B1* | 1/2017 | Fouts ..................... G09G 5/377 |
| 9,646,418 | B1* | 5/2017 | Lotto ..................... G06T 19/006 |
| 10,026,226 | B1 | 7/2018 | Lotto |
| 2009/0215427 | A1 | 8/2009 | Hawkins |
| 2010/0013860 | A1 | 1/2010 | Mandella et al. |
| 2010/0023878 | A1 | 1/2010 | Douris et al. |
| 2010/0091017 | A1 | 4/2010 | Kmiecik et al. |
| 2011/0055135 | A1 | 3/2011 | Dawson et al. |
| 2011/0279445 | A1 | 11/2011 | Murphy et al. |
| 2011/0279453 | A1* | 11/2011 | Murphy .................. G06T 5/002 345/420 |
| 2011/0279478 | A1 | 11/2011 | Bitra |
| 2012/0086728 | A1 | 4/2012 | McArdle et al. |
| 2012/0176516 | A1 | 7/2012 | Elmekies |
| 2012/0242798 | A1 | 9/2012 | McArdle et al. |
| 2012/0249741 | A1 | 10/2012 | Maciocci et al. |
| 2013/0016123 | A1 | 1/2013 | Skarulis |
| 2013/0031142 | A1 | 1/2013 | Wester |
| 2013/0155181 | A1 | 6/2013 | Williams et al. |
| 2013/0293585 | A1 | 11/2013 | Sudou |
| 2013/0325394 | A1 | 12/2013 | Yuen et al. |
| 2014/0002496 | A1 | 1/2014 | Lamb et al. |
| 2014/0055491 | A1 | 2/2014 | Malamud et al. |
| 2014/0063065 | A1 | 3/2014 | Nishikawa et al. |
| 2014/0267419 | A1 | 9/2014 | Ballard et al. |
| 2015/0016712 | A1 | 1/2015 | Rhoads et al. |
| 2015/0124106 | A1 | 5/2015 | Tomita |
| 2015/0235610 | A1 | 8/2015 | Miller et al. |
| 2015/0254905 | A1 | 9/2015 | Ramsby |
| 2015/0332387 | A1 | 11/2015 | Stacey et al. |
| 2015/0379772 | A1 | 12/2015 | Hoffman |
| 2016/0004298 | A1 | 1/2016 | Mazed et al. |
| 2016/0026253 | A1 | 1/2016 | Bradski et al. |
| 2016/0133230 | A1 | 5/2016 | Daniels et al. |
| 2016/0147408 | A1 | 5/2016 | Bevis et al. |
| 2016/0188585 | A1 | 6/2016 | Durham et al. |
| 2016/0232715 | A1 | 8/2016 | Lee |
| 2016/0253843 | A1 | 9/2016 | Lee |
| 2016/0266386 | A1 | 9/2016 | Scott et al. |
| 2016/0284079 | A1 | 9/2016 | Persely |
| 2016/0291922 | A1 | 10/2016 | Montgomerie et al. |
| 2016/0292926 | A1 | 10/2016 | Rosenthal et al. |
| 2017/0021273 | A1* | 1/2017 | Rios ....................... G06T 19/006 |
| 2017/0053451 | A1* | 2/2017 | Mott ..................... G06F 3/04815 |
| 2017/0124713 | A1* | 5/2017 | Jurgenson ................ G06T 7/73 |
| 2017/0243403 | A1 | 8/2017 | Daniels et al. |
| 2017/0278486 | A1 | 9/2017 | Ishikawa et al. |
| 2017/0307891 | A1 | 10/2017 | Bucknor et al. |
| 2017/0316639 | A1 | 11/2017 | Lyons et al. |
| 2017/0337744 | A1 | 11/2017 | Martin |
| 2017/0337745 | A1 | 11/2017 | Martin |
| 2017/0344223 | A1 | 11/2017 | Holzer et al. |
| 2017/0367766 | A1 | 12/2017 | Mahfouz |
| 2018/0005450 | A1 | 1/2018 | Daniels et al. |
| 2018/0033208 | A1 | 2/2018 | Martin |
| 2018/0059902 | A1 | 3/2018 | Martin |
| 2018/0075591 | A1 | 3/2018 | Du et al. |
| 2018/0197343 | A1 | 7/2018 | Hare et al. |
| 2018/0210628 | A1 | 7/2018 | McPhee et al. |
| 2019/0050137 | A1* | 2/2019 | Mildrew ............ G06F 3/04815 |

FOREIGN PATENT DOCUMENTS

| | | |
|---|---|---|
| WO | WO 2018/018072 A1 | 2/2018 |
| WO | WO 2018/035564 A1 | 3/2018 |

OTHER PUBLICATIONS

"ECEF", Wikipedia [online], [retrieved on Sep. 13, 2017], Retrieved from the Internet: <https://en.wikipedia.org/wiki/ECEF>, 2 pages.

"Geographic coordinate system", Wikipedia [online], [retrieved on Sep. 13, 2017], Retrieved from the Internet: <https://en.Wikipedia.org/wiki/Geographic_coordinate_system>, 1 O pages.

EGM96, Wikipedia [online], [retrieved on Sep. 13, 2017], Retrieved from the Internet: <https://en.wikipedia.org/wiki/ EGM96>, 3 pages.

International Search Report and Written Opinion, Patent Cooperation Treaty Application No. PCT/AU2017/050473, dated Jul. 21, 2017, 14 pages.

International Search Report and Written Opinion, Patent Cooperation Treaty Application No. PCT/AU2017/050474, dated Aug. 23, 2017, 22 pages.

International Search Report and Written Opinion, Patent Cooperation Treaty Application No. PCT/AU2017/050759, dated Oct. 24, 2017, 16 pages.

International Search Report and Written Opinion, Patent Cooperation Treaty Application No. PCT/AU2017/050895, dated Nov. 28, 2017, 10 pages.

Martin, Paul Simon, "Fine-Grain Placement and Viewing of Virtual Objects in Wide-Area Augmented Reality Environments", U.S. Appl. No. 15/600,446, filed May 19, 2017, Specification, Claims, Abstract, and Drawings, 57 pages.

Martin, Paul Simon, "Fine-Grain Placement and Viewing of Virtual Objects in Wide-Area Augmented Reality Environments", U.S. Appl. No. 62/340,118, filed May 23, 2016, Specification, Claims, and Drawings, 16 pages.

Martin, Paul Simon, "Telelocation: Location Sharing for Users in Augmented and Virtual Reality Environments", U.S. Appl. No. 15/656,956, filed Jul. 21, 2017, Specification, Claims, Abstract, and Drawings, 45 pages.

Bairstow, David, "The Difference Between Location Accuracy and Precision and Why You Need to Know", Skyhook Wireless Blog [online], [retrieved on May 7, 2018], Retrieved from the Internet: <https://www.skyhookwireless.com/blog/advertising/the-difference-between-location-accuracy-and-precision-and-why-you-need-to-know>, Jul. 7, 2015, 4 pages.

Pacha, Alexander, "Sensor fusion for robust outdoor Augmented Reality tracking on mobile devices", Master's Thesis, Institute for Software & Systems Engineering, Dec. 20, 2013, 106 pages.

United States Office Action, U.S. Appl. No. 15/600,446, filed Jan. 17, 2020, 14 pages.

(56) References Cited

OTHER PUBLICATIONS

United States Office Action, U.S. Appl. No. 15/600,446, filed Jul. 8, 2019, 12 pages.
United States Office Action, U.S. Appl. No. 15/600,446, filed Mar. 22, 2019, 13 pages.
United States Office Action, U.S. Appl. No. 15/600,446, filed Aug. 1, 2018, 12 pages.

* cited by examiner

MEDIA TAGS—LOCATION-ANCHORED DIGITAL MEDIA FOR AUGMENTED REALITY AND VIRTUAL REALITY ENVIRONMENTS

CROSS REFERENCE TO RELATED APPLICATION

This application is a continuation of U.S. application Ser. No. 15/600,446, filed May 19, 2017, which claims the benefit of U.S. Provisional Patent Application Ser. Nos. 62/340,110, filed May 23, 2016, and 62/340,118, filed May 23, 2016, all of which are incorporated by reference herein.

FIELD OF INVENTION

Embodiments of the disclosure relate to augmented reality and virtual reality environments.

SUMMARY

According to some exemplary embodiments, the present disclosure is directed to a method including creating digital media, placing the digital media in a computer graphics environment, the computer graphics environment further comprising visually perceptible elements appearing as real objects placed in a real world setting, and viewing the digital media when at the real world setting. Exemplary methods may include the digital media comprising any of a text tag, an image tag, a movie tag, an audio tag, a social media tag or a combination thereof and viewing the digital media when at the real world setting based on an author's sharing settings or based on a viewer's filtering settings. The digital media may be stored on a remote server or cached on a device. The digital media may be viewed when at the real world setting as increasing in size of the digital media as a function of increasing proximity to the real world setting. Additionally, the digital media may have any of a flag pole, a frame, an avatar badge, a title panel, a media panel, a comments panel or a combination thereof.

According to further exemplary embodiments, the creating of the digital media may include inclusion of features from a source of social media, and the placing of the digital media by way of an augmented-reality interface. The viewing of the digital media may occur when at the real world setting by way of an augmented-reality interface. The viewing of the digital media may also include utilizing data received from a body or body part motion-tracking sensor.

In various exemplary embodiments, a method may comprise creating digital media, placing the digital media in a virtual reality computer graphics environment, the virtual reality computer graphics environment further comprising visually perceptible elements appearing as objects in the virtual reality computer graphics environment, and viewing the digital media in the virtual reality computer graphics environment. Additionally, a method may include establishing a network connection, remotely viewing creating of digital media in real time by way of the network connection, and the creating of the digital media including the placing of the digital media in a computer graphics environment, the computer graphics environment also including visually perceptible elements appearing as real objects placed in a real world setting.

Exemplary methods may also include establishing a network connection, remotely viewing creating of digital media in real time by way of the network connection, with the creating of the digital media further including the placing of the digital media in a virtual reality computer graphics environment, the virtual reality computer graphics environment further including visually perceptible elements appearing as objects in the virtual reality computer graphics environment.

Various exemplary systems include an augmented reality and virtual reality server connected to a network, and a client device connected to the network, the client device having an augmented reality and virtual reality application. Further exemplary systems include a body or motion sensor connected to the client device and/or an augmented reality and virtual reality interface connected to the client device.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

Figure 1:
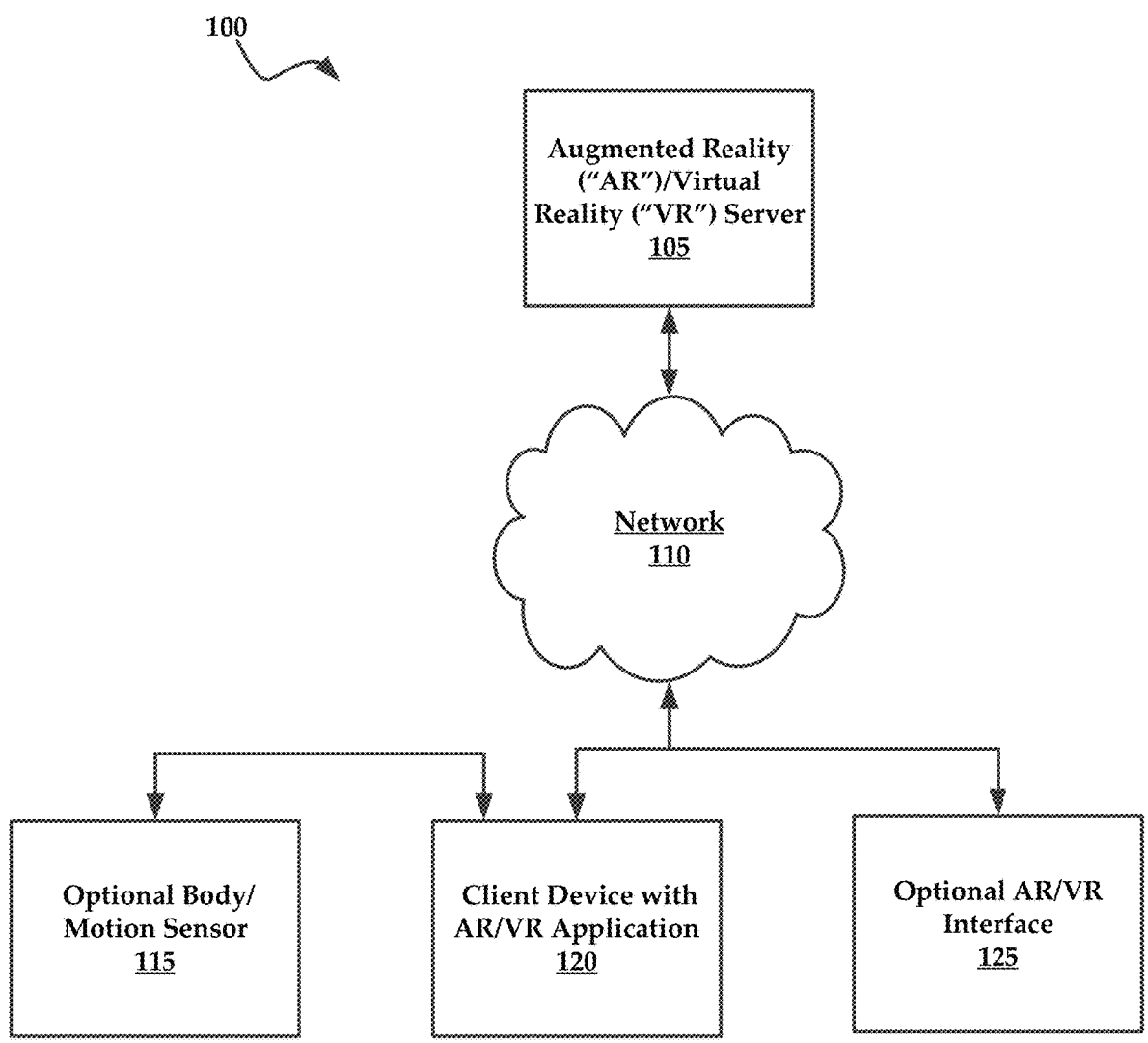
FIG. 1 is a flow chart of an exemplary architecture depicting the physical system components for practicing aspects of the present technology.

Digital media does not currently allow users to create and associate digital content with specific locations in the world so that that content could be visualized in situ as if it existed in some tangible/visual form like other objects within that world.

For example, if we post a photo or movie to current social media websites, the best process that that we currently have for associating that post with its real world location, is to add a description of the location such as " . . . at ABC Cinemas", or "Jo's Grill", and/or the GPS coordinates of that location, using a website or software application. More generally, the problem with such current methods is that locations are broadly deduced as a single location (e.g. point on a 2D map, street address, etc.) for places that could be very large in area.

Instead, users should have a mechanism allowing them to set and associate a specific fine-grain location for that content such as "one meter to the right of the main door outside ABC Cinema" or "at table #4 in Jo's Grill", and to visualize that content in situ just like other objects, if the user is located within a reasonable proximity of the location that the content is associated with.

For example, using a device with a viewport (e.g. a cellular phone with a built in camera and touch screen display) a user should be able to view their surroundings in the real world through that viewport and see any digital content associated with locations that lie within that viewport on their screen, just as if they were real world objects. If the user is walking past a cinema, they should be able to see any existing photo or movie posts that appear one meter to the right of the main door by way of an augmented reality interface provided by their device.

We then take these examples and extend them to a virtual reality environment whereby the locations that can be associated with user content are not real, but virtual (e.g. in a video game world). In these cases, authors of the content can "attach" their media to fine-grain virtual locations and viewers of that content can view it in the same location as the author intended by way of a virtual reality interface (VRI). A VRI in this case may be a setup as simple as a single smartphone, visualizing a photo sphere image which is navigable by rotating the smartphone device, or something more complex such as a room-sized VR rig utilizing head mounted displays and laser motion trackers.

Provided herein are methods for attaching digital content ("Media Tags") to both coarse-grain and fine-grain real-world locations, via augmented reality, and to locations in virtual reality environments such that they may be both authored and viewed contextually similar to physically placed, tangible objects in real life.

The content may also have social context which may include, but is not limited to, an associated user profile and contributions from other users (e.g. likes, comments, ratings, etc.). It may be created and shared anew by users, mined from existing sources such as, but not limited to, third party social media timelines, or viewed by others based on the authors' sharing settings and/or the viewers' filtering settings.

Data associated with the media content may persist in the form of, but not limited to, combinations of: image, text, audio, movie data, etc. This data may be stored on a remote server and/or cached locally on the user device's storage.

Visibility of previously-created Media Tags is based on various filtering techniques including, but not limited to:

The orientation and field of view provided by the user's viewing device.

A Media Tag's proximity to the user.

Visibility permission settings chosen by the author of each Media Tag (e.g. visible to public, friends, friends-of-friends etc.)

Filter settings chosen by the viewer (e.g. only view Media Tags from All, friends, friends-of-friends, etc.).

For visual clarity, Tags that are spatially close to each other may be grouped together such that multiple user content can be associated with a single Media Tag. Users can switch between the content by way of appropriate user interface elements.

Media Tags that are created by a user will be immediately viewable by other users that are in proximity to their real-world locations. Likewise, Media Tags that are updated or deleted by a user, will result in the Media Tag being updated or removed from the viewport of other users that are in proximity to those Media Tags' world locations.

Media Tags may be perspective-distorted such that tags that are closer to a viewer appear larger than those that are further away. By extension, if a user places a Media Tag in front of them, a remote viewer that is further away but still in eyesight of that user will see that Media Tag appear near the location of its creator, however the size of that Media Tag will be adjusted based on its relative distance from the user. If the creator is far from the viewer, the Media Tag may appear smaller than if the creator is close to the viewer.

In addition to perspective distortion, Media Tags may also take on forms with varying levels of detail such that Media Tags which are further away from a user feature less detail than those which are closer which may display more detail.

Media Tags may be oriented and configured by their authors such that the Media Tags will be viewed at the orientation set by the author, or may be viewed at any angle from a location within a proximity around the Media Tag. For example, in FIG. 17, the Media Tags 1715, 1720, and 1725 appear to the user as perspective correct, as set by their author.

Throughout this specification various terms are used and shall assume the following meanings and assumptions:

Augmented Reality ("AR"): a digital system or interface through which the user can view their surroundings with augmentations of that view. Any discussion of AR or related aspects of it refers to augmentation of a real world or "AR" environment. An AR platform creates a virtual graphics coordinate space that coincides with the real-world space around a user and renders computer graphics relative to that virtual graphics coordinate system such that those graphics appear to exist in the real world. An appropriate viewing device is also assumed for the user, such as but not limited to: a head-mounted display (e.g. augmented reality glasses or goggles) or a smart phone (i.e. acting as a viewing portal that displays computer graphics on top of, or blended with, a live video feed of the world as seen by camera hardware embedded in the device).

Virtual Reality ("VR"): a virtual reality platform creates a virtual graphics coordinate space into which computer graphic content is rendered in such a way that when viewed through a viewing device, all the user sees are computer graphics. No real world objects are seen in this environment. Appropriate viewing and interaction devices are also assumed for the user, such as, but not limited to: head-mounted displays, optionally with body or body-part motion tracking sensors and software, smart phones (i.e. acting as a viewing portal that displays computer graphics on top of, or blended with, a computer graphics environment background).

Virtual Reality Interface (VRI): a device allowing for visualization, and optionally, interaction within virtual computer graphic environments.

Viewport: the field of view provided by the client device.

User Interface or UI: visual elements onscreen and/or physical interfaces that allow the user to interact with a digital system.

Real time: a digital approximation of time that is as close to real time as possible given the technical constraints of a system architecture such as, but not limited to: network lag, server processing.

FIG. 1 illustrates an exemplary architecture 100 depicting the physical system components that could allow for the placement and storage of digital media in an AR or VR environment. This architecture may generally include, but is not limited to, a client device with an AR/VR software application 120 through which a user interacts with, a server 105 for storing data from and communicating with client device 120, and a computer network 110 over which client device 120 communicates with the server 105. Client device 120 has software which allows for the creation, placement, and viewing of digital content in an AR/VR world. Client device 120 may optionally utilize body/motion sensor peripherals 115 and data to perform client-side tasks, and may optionally provide an AR and/or VR user interface 125 through which a user may interact with.

Examples of body/motion sensor peripherals 115 may include, but are not limited to, accelerometers, GPS trackers, and altimeters. Examples of client devices 120 may include, but are not limited to, cellular phones (aka "smart" phones"), VR headsets/goggles, etc. Examples of optional AR and/or VR user interfaces 125 may include, but are not limited to: touch screens, handheld controllers (e.g. game pads), AR glasses that display a video stream provided by another client device.

The network 110 may comprise of a communication path consisting of, but not limited to: the Internet and public and/or private networks. Such communications may take place over wireless and/or wired connections (e.g. Ethernet), using the networking peripherals available on the server 105 and client device 120.

Figure 2:
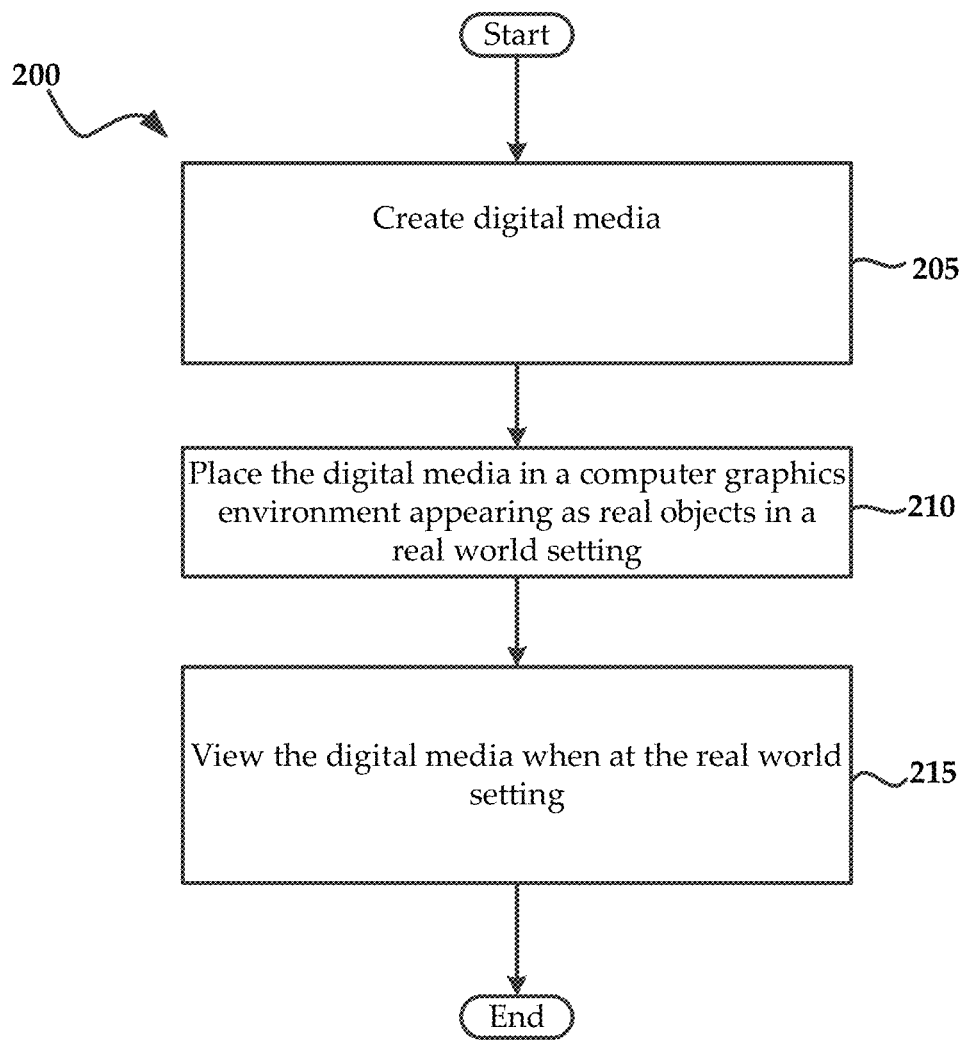
FIG. 2 is a flow chart of an exemplary method for creating, placing, and viewing Media Tags in an AR environment.

FIG. 2 illustrates an exemplary process 200 for creating and placing digital media in the real world using a client device 105. Using digital media software available to the client device (105), a user creates digital content 205. The software may then obtain the real world location (e.g. GPS coordinates) using the peripherals 115 available on or to the device. A user may orient the yaw, pitch, and roll of their client device's viewport and then use an appropriate user interface (e.g. touch gesture on a touch screen) to determine the location for the digital media relative to their position. The software provides an appropriate user interface through which the user can then associate the digital media 205 with the real world location. This information may be stored on the client device 120, and may optionally be sent to the server 105 and stored. With this data now available, the user may now see that digital media appear on their device's display as if it were a real-world object 210 whenever they use their device to view that location 215. The storage of data allows the information to be recalled for viewing whenever the user views that location again.

For example, digital media software executing on a smart phone may allow a user to move a Media Tag onto an object of interest on their device's viewport's live view of the world, after which, the GPS coordinates of that object of interest (or a location within a close proximity to it) are captured by the software. Once captured, the software may then associate them with digital content that is of interest to and/or specified by the user (e.g. a picture taken of the object of interest). It may then cache this data on the phone and/or store it on a server that it communicates with. The picture may then appear to the user whenever the user views that location through their smart phone's display.

Figure 3:
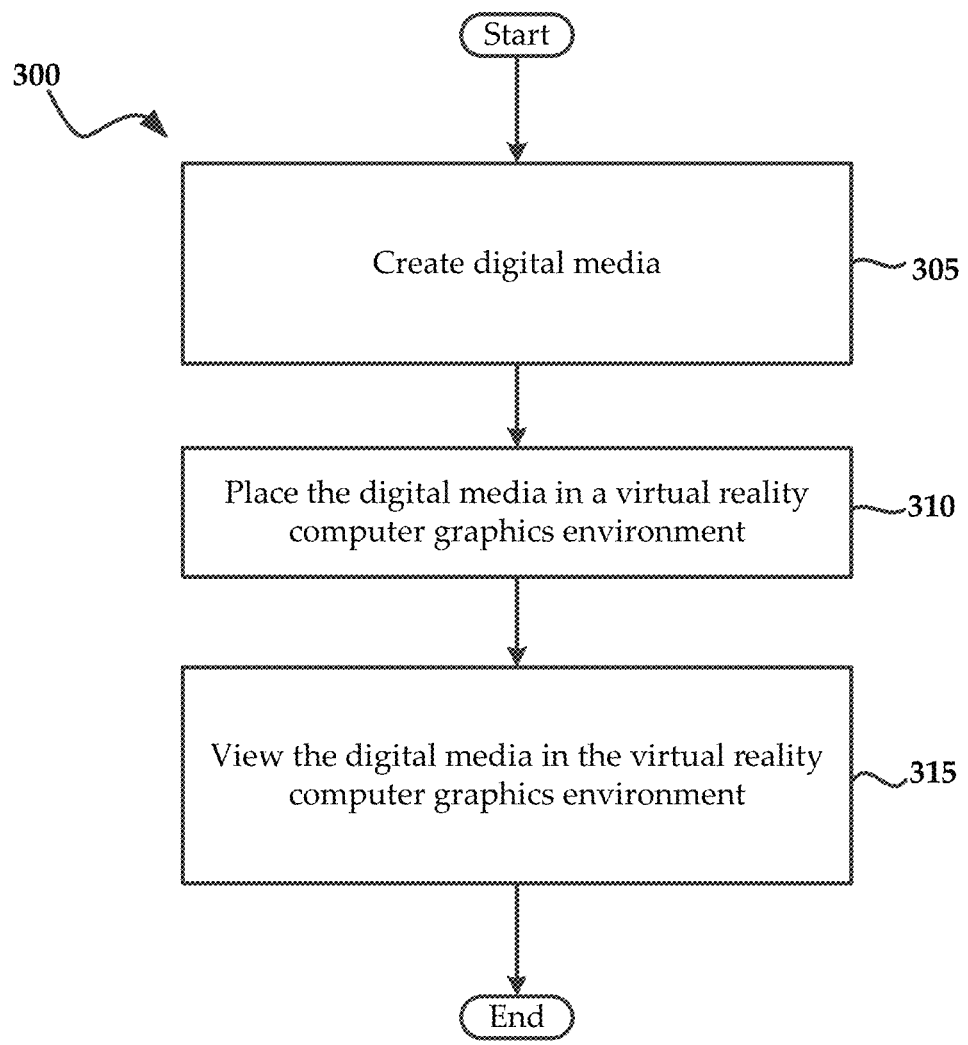
FIG. 3 is a flow chart of an exemplary method for creating, placing, and viewing Media Tags in a VR environment.

FIG. 3 illustrates an exemplary process 300 for creating and placing digital media in a virtual world using a client device 105. Using digital media software on the client device (105), a user navigates to a location (or remains at this initial position) and then orients the yaw, pitch, and roll of their device's viewport (e.g. they hold up their cellular phone to take a picture of something). Using either a pre fixed distance in front of them, or a user adjustable distance controllable through an appropriate user interface, the user specifies the location in front of them as the location where they want to create digital content 305. The software may then obtain a computer world location (e.g. a coordinate in 3D space) using the peripherals 115 provided on or available to the device. The software and/or device may provide an appropriate user interface through which the user can then associate the digital media with the real world location 310. This information is stored (e.g. cached) on the client device 120, and may optionally be sent to the server 105 and stored. With this data now available, the user may now see that digital media appear on their device's display whenever they use their device to view that location 315. The storage of data allows the information to be recalled for viewing whenever the user views that location again.

For example, a digital media software component 120, may allow a user to capture a picture of a virtual object of interest through VR goggles and a hand held controller connected to the game machine. Once captured, the software may then obtain the computer world coordinates of that virtual object, and associate them with the picture. It may then cache this data on the game machine and/or store it on a server that it communicates with. The picture may then appear to the user whenever the user views that virtual location again through their VR goggles.

Note: in an AR world, location data may be composed of latitude, longitude, and altitude. To acquire this information, an AR system may use the device's onboard peripherals such as the GPS system, compass, altimeter, maps, etc. In a VR world, location data may be composed of numeric (e.g. floating point) 3D coordinates (x, y, and z).

The user interface may include a visual indicator which could be in the center of their viewport (e.g. cross hairs), to represent the placement point corresponding to the 2D location in the viewport at which the Media Tag will be placed. Alternatively, the system may assume that the center or some other position of the user's viewport is the placement point, and not display such a visual indicator. The placement point is assumed to be at an offset relative from the user's current world location in 3D space. This offset may be set in various ways including, but not limited to:

through a user or system preference, a constant set by the system, or dynamically by the user through an appropriate user interface (e.g. touch dragging it onto the world displayed in their view port).

Another user interface element may allow the user to set/confirm the location of interest which results in the creation and placement of a new Media Tag. Examples of such a user interface include, but are not limited to:

Pressing a button on the device.

Swiping a Media Tag from an onscreen menu displayed on a touch screen, to another part of the screen which is displaying the world.

Figure 4:
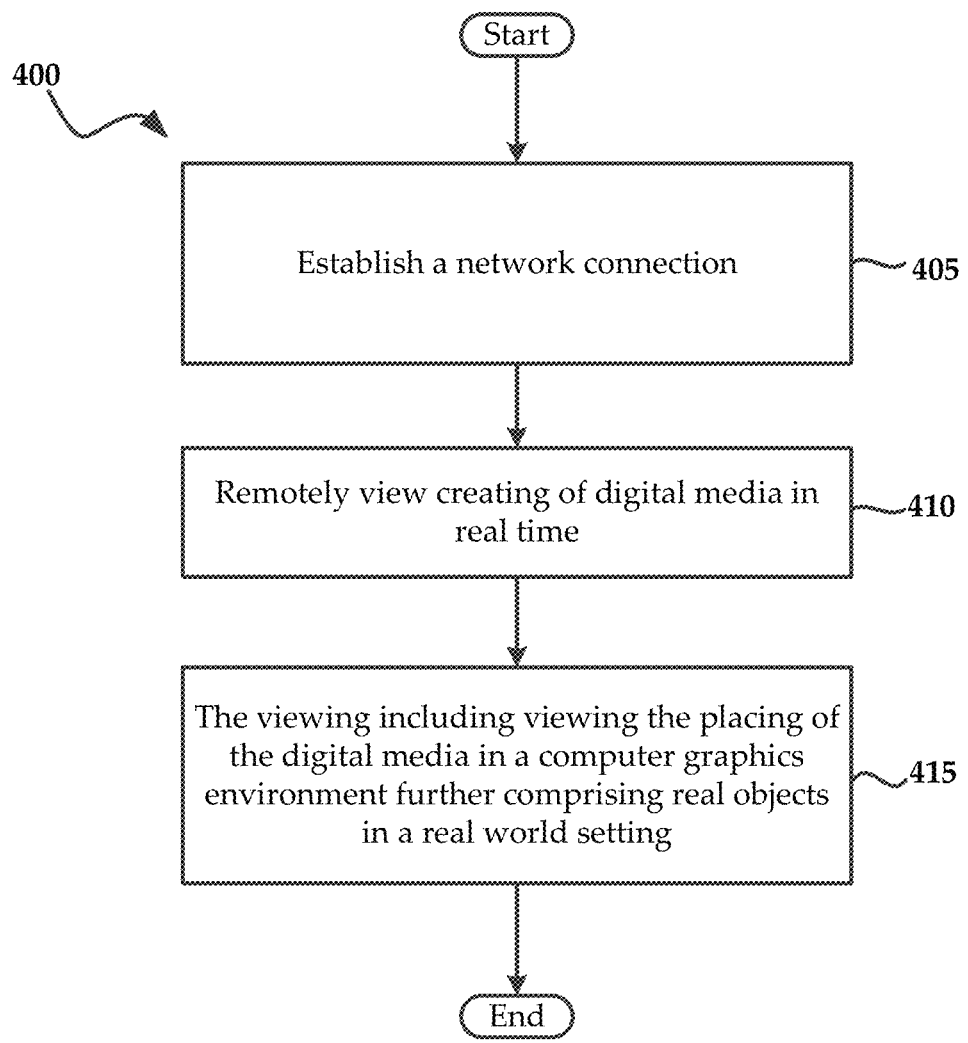
FIG. 4 is a flow chart of an exemplary method for remotely viewing Media Tags in an AR environment.

FIG. 4 illustrates an exemplary process 400 for viewing 410 the creation of digital media in the real world in real time, over a network 405, as if that digital media were real world object(s) 415. Using digital media software available to the client device (105), the user may see new digital content appear on their display, as it is being created by other users within a certain proximity. The user may optionally also see updates/deletions to existing digital content in real time as it is changed by other users within a certain proximity. A given client device that is executing digital content software 120 connects to a server 105 over a network 405. The server stores digital media and the associated real world locations, and communicates additions, updates, and/or deletions of the digital media to all client devices executing the digital content software that are within a given proximity to the created or modified digital media. Another (remote) user whose client device is within this proximity and viewing the created or modified digital media 410, will see the new or modified objects change in real time 415.

For example, User A is using a smart phone that is executing digital content software that is communicating with a server that stores and tracks all digital media that is or has been placed in the real world. User A is navigating the real world at the same time as User B who is in close proximity of User A, and who is creating new digital media and associating it with a location. User A points their client device at the location where User B has created the new digital media, and sees the new digital content appear on their display. This happens in real time and the new digital content appears on the User A's display as if it were a real object in the world.

When the user first enters the world (i.e. when they boot up the AR or VR system software) the world's origin is determined. The origin is used when calculating the world position of a Media Tag as described below. The origin may be set at some predefined location, or based on the location where the user was when the system was first booted. To maintain mathematical precision when using the origin to calculate locations, the origin may optionally be updated to the user's current location after the user navigates a certain distance (e.g. after navigating 10 km away from their current location). Maintaining such mathematical precision may be necessary when it is difficult to represent precise locations in large world spaces (e.g. the entire planet) using floating point data.

When a Media Tag is placed, the author's world position, along with the offset, may be stored and later used to calculate the absolute world position of the new Media Tag, relative to the world's origin. The orientation of the Media Tag may also optionally be computed if the system supports the display of Media Tags at the orientation that the user placed the Media Tag. The Media Tag then appears on the user's viewport as if it were any other tangible object within the user's world.

Figure 5:
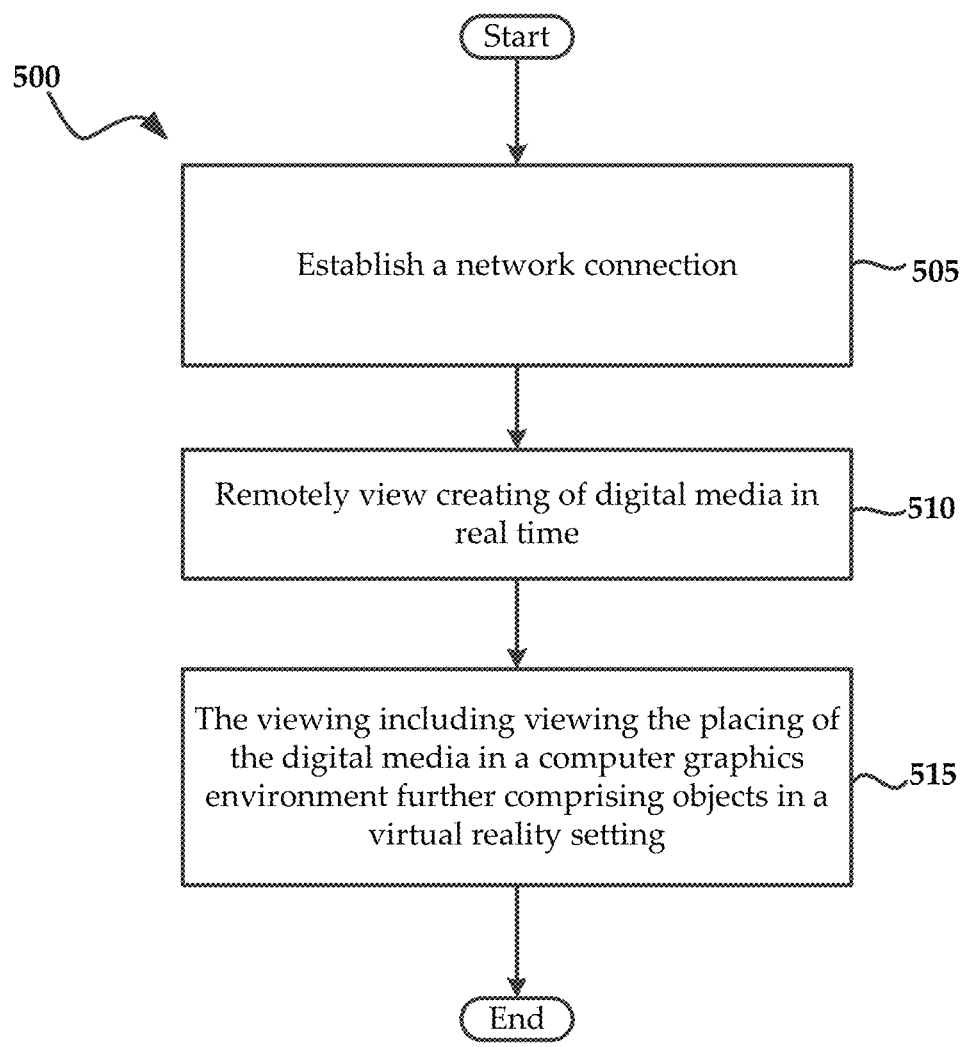
FIG. 5 is a flow chart of an exemplary method for remotely viewing Media Tags in a VR environment.

FIG. 5 illustrates an exemplary process 500 for remotely viewing 510 the creation of digital media in a virtual world in real time, over a network 505, as if that digital media were like other virtual world object(s) 515. Using digital media software available to the client device (105), the user may see new digital content appear on their display, as it is being created by other users within a certain proximity. The user may optionally also see updates/deletions to existing digital content in real time as it is changed by other users within a certain proximity.

A given client device that is executing digital content software 120 connects to a server over a network 505. The server 105 stores digital media and the associated real world locations, and communicates additions, updates, and/or deletions of the digital media to all client devices executing the digital content software 120 that are within a given proximity to the created or modified digital media. Another (remote) user whose client device is within this proximity and viewing the created or modified digital media 510, will see the new or modified objects change in real time 515.

For example, User A has VR goggles and a hand held controller that are connected to a game console executing digital media software 120. User A is navigating a virtual world at the same time as User B who is in close proximity of User A and who is creating new digital media and associating it with a location. User A is looking at the location where User B is creating the digital content. Once created, User A sees this new digital content appear on their screen in real time as if it were another virtual world object.

Figures 6A, 6B:
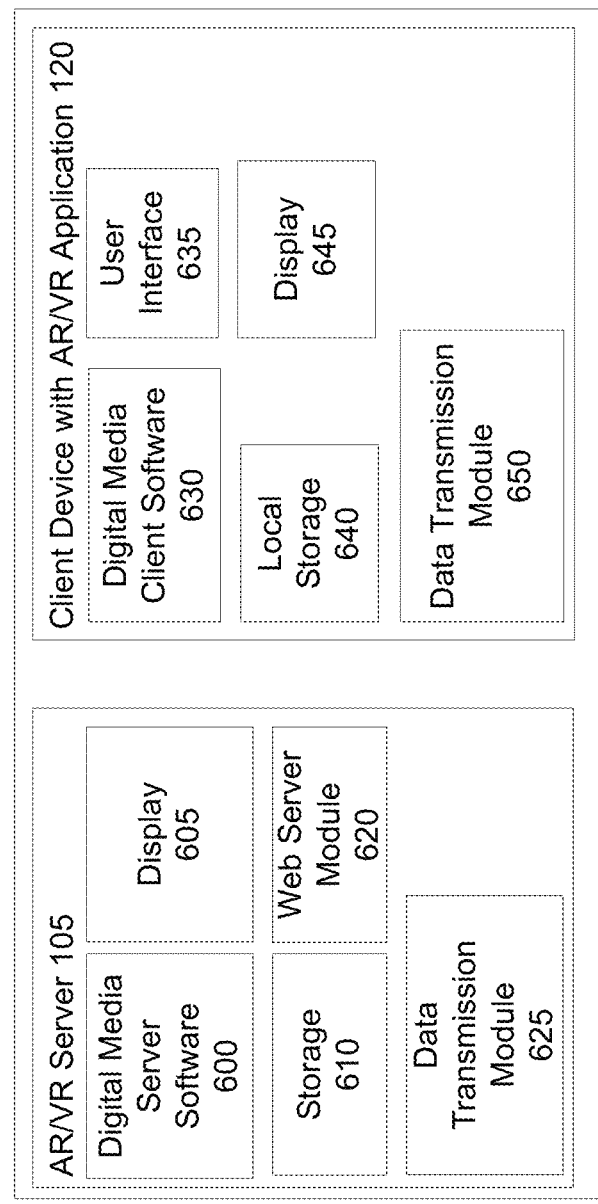
FIG. 6A is a block diagram of an exemplary server side system for practicing aspects of the present technology. Note that a "server" may optionally comprise multiple distributed computer systems.
FIG. 6B is a block diagram of an exemplary client side system for practicing aspects of the present technology.

FIG. 6A is a block diagram showing exemplary components which may be part of server 105 and used to store and communicate digital content updates to remote client devices. The server 105 may host digital media server software 600 capable of communicating with client devices 120. The server may use or communicate with a storage component 610 (e.g. a database management system), to store and retrieve digital media and associated data. The server may utilize web server software 620 to expose the digital media server software 600 over the network to remote clients. The web server software 620 in conjunction with the digital media software 600, may expose a high level communications path or protocol (e.g. a web API), through which client side digital media software 630 executing on client devices 120 and the server side digital media software 600 may exchange data with. This data may be sent through data transmission module 625 which provides the ability to send and receive information over a computer network (e.g. an Ethernet connection).

FIG. 6B is a block diagram showing exemplary components which may be part of client device 120 allowing a user to create, edit, and/or view digital content in an AR or VR world. This functionality may be provided on the client device 120 through digital media client software 630 installed or available on client device 120. Client device 120 may feature user interface 635 elements (e.g. touch screen controls, buttons, etc.) allowing the user to author digital content in, and navigate around, an AR/VR world. Client device 120 may also provide an appropriate display 645 (e.g. touch screen, VR goggles, etc.) allowing the user to view an AR/VR world as well as digital content that may have been placed in that world. The client device 120 may have or utilize local storage 640 for the purposes of caching any data necessary to author and view digital content as objects in the world they are viewing. The client device 120 may communicate with a server 105 using the high level communications path or protocol exposed by the web server module 620. This communication exchange may take place through data transmission module 650 which provides the ability to send and receive information over a computer network (e.g. Wi-Fi).

Storage of digital data involves persisting digital data locally on a client device and/or over a network to a remote server. A server 105, along with its storage facilities, may be used to store and communicate the state and data of all Media Tags which have been placed in the world by all users, over a computer network 110.

Storage of multimedia data may be required on both the client device and/or on the centralized server 105. When multimedia data is created on a client device and associated with a Media Tag, that data may be stored on the device as a local representation of that data, for consumption by the user. The data may also be sent to a server along with the data associated with the Media Tag, so that the content can be viewed by other users capable of viewing the Media Tag. For example, if a user captures a video and associates it with a new Media Tag, the video data may be uploaded along with the Media Tag, over the network, for storage on the server.

Caching data on the client device may also be necessary for various situations including, but not limited to:

storing all Media Tags within a given radius of a user, that are, or could become visible in their viewport as the user changes orientation and/or navigates to a new location.

allowing data to be uploaded or downloaded from a server when no network connectivity is available.

improving latency and speed due to a slow network connection or load on the server.

saving a new Media Tag or modifications to an existing Media Tag, locally on a client device before committing them to the server. For example a user may create a new Media Tag, store it locally to their device, and then edit it at a later time before uploading it to the server.

minimizing mobile data usage costs.

minimizing the battery consumption of a client device 120.

As a user navigates through the world, data for new or updated Media Tags visible to the user may be sent from the server 105 to the client device 120 and cached in local storage 640. Likewise, cached data for Media Tags that are no longer visible to a user, may optionally be discarded in order to conserve or reuse the limited storage space typically available on most client devices.

In order for the digital media software on the client device (630) to know what needs to be displayed, it may need to work in close collaboration with the server, which has knowledge about all Media Tags in the world and their current state. This would require coordination between the client device 120 and the server 105 which may be accomplished using a protocol or API which both the client device and the server can communicate to each other with. For example, the server may include a web server component 620 that exposes an API or high level protocol provided by the digital media server software 600 through which client devices can make requests and receive responses about Media Tags.

When performing a given operation (e.g. adding a new Media Tag), a client may make one or more requests to the server 105, each of which may cause the server to return a response to the client.

For example, consider a client device that has created a new Media Tag:

The client may send a request with the necessary data to persist a Media Tag on the server.

The server responds with an acknowledgement and an ID for the new Media Tag so that the client device can confirm successful storage of the Media Tag and identify the Media Tag on which to perform subsequent operations.

The client device then sends a request with content data (e.g. text, video data. etc.) to the server indicating that it is to be stored and associated with that Media Tag.

The server returns an acknowledgement response indicating that the content data was stored.

The server 105 may also communicate with other social media networks, using the web API's provided by those social media networks, and may expose a communications path or high level protocol (e.g. web API) through which those other networks may communicate with the server 105.

A storage data model that encapsulates the required properties to successfully store and load Media Tags may include, but is not limited to, the following information:

Geo Coordinate: a three-component vector of floating point numbers representing the real-world reference location of the origin of the Media Tag. For AR, the three components store the Latitude, Longitude, and Altitude. For VR, the three components store the x, y, and z components of the origin.

World Offset: a graphics-space 3D vector offset of the Media Tag from the authoring user's location.

World Orientation: a graphics-space rotation of the Media Tag composed of a three-component vector of floating point numbers, representing the normal for the Media Tag's orientation. Since Media Tags may be displayed like real world signs (e.g. displayed vertically as if they are perfectly erected signage), two of the vector's components may be zeroed out. In this case, only the Media Tag's heading is actually used and therefore inverting this normal gives the direction that the Media Tag is facing.

Media Content: an ID that uniquely identifies the Media Tag's multimedia content (e.g. compressed Image, Video, Audio data etc.) and is supplied by a remote storage server. Multimedia content may be stored on the server and retrieved by a client device when displaying a Media Tag, by requesting the multimedia data corresponding to the ID (e.g. while a user's client device 620 may cache such data during creation, the client devices of other users may download the data from the server 105).

Text Content: the data that is associated with the text regions of the Media Tag. This may include, but is not limited to: raw text, HTML encoded strings, localized text in various languages, and localized text applicable to the region configured in the client device's OS.

Creation Date: a timestamp representing the initial creation date and time of the Media Tag.

Modification Date: a timestamp representing the last date and time when a Media Tag was modified.

Author: an optional record identifying the user that created the Media Tag. This may include, but is not limited to, information such as: user ID, username, URL to user's avatar image, etc.

Social Media Data: data related to the social media aspects of a Media Tag. Examples include, but are not limited to: likes, ratings, comments, URLs to other social media networks which have some association with the Media Tag, etc.

Unique ID: an identifier that uniquely identifies the Media Tag.

Accuracy: a value indicating the accuracy of the Media Tag's location (e.g. a radius in meters for which a Media Tag has one standard deviation of confidence of being within). The type and meaning of this value may be device specific.

Client Device Information: information about the client device used to create the Media Tag such as, but not limited to: model, OS, and OS version. This information may be used when interpreting the value of the "Accuracy" field described in the previous point.

Figure 7A:
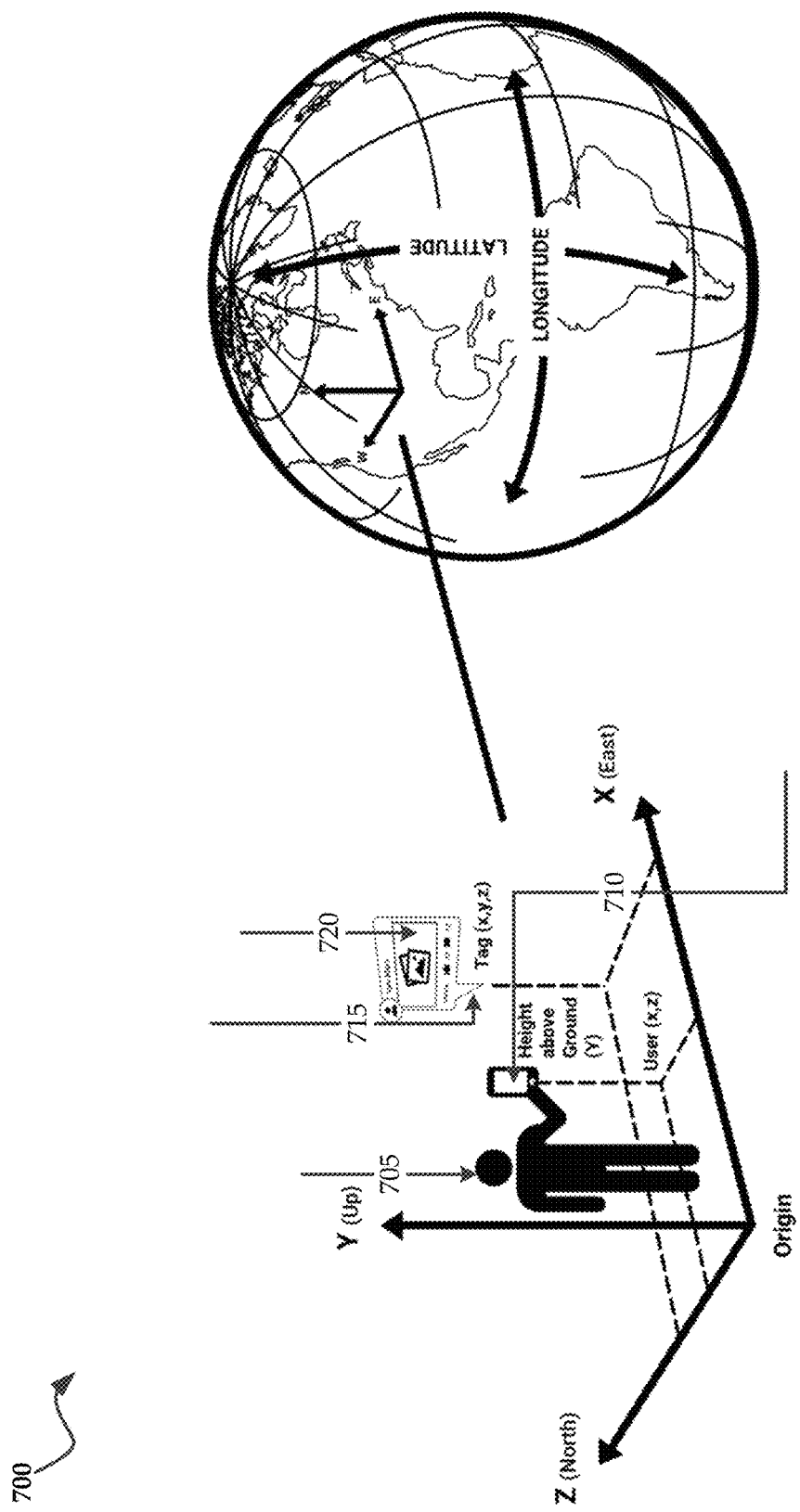
FIG. 7A is an illustration of a user using a client device to author and view Media Tags in an AR environment.

FIG. 7A provides a conceptual diagram 700 depicting an example of a user 705 in the real world. The user has an AR client device 710 that they are using to look through at a location of interest 715 through the device's display 645, and seeing digital content 720 appearing on the display in that location as if it were a real world object.

Figure 7B:
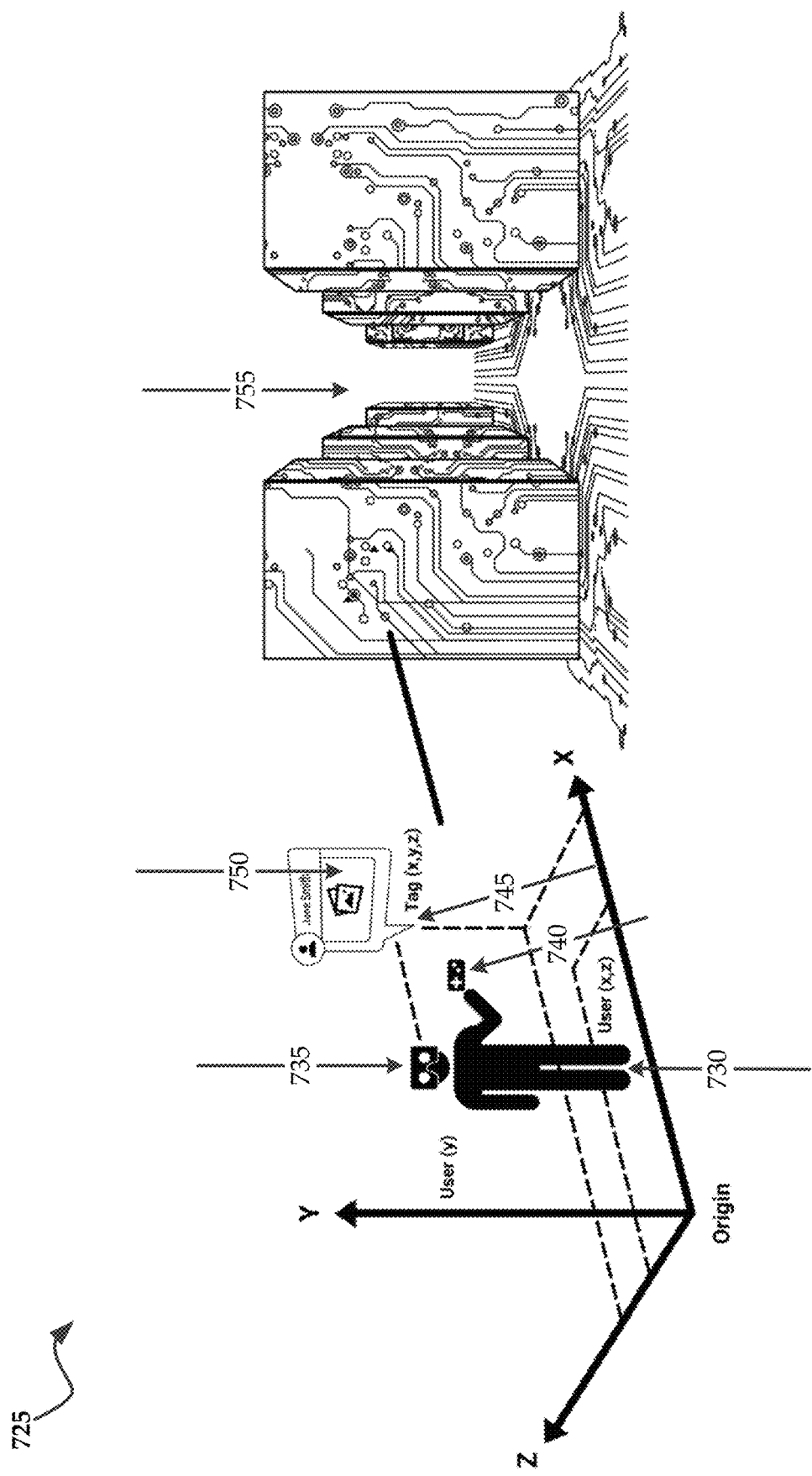
FIG. 7B is an illustration of a user using a client device to author and view Media Tags in a VR environment.

FIG. 7B provides a conceptual diagram 725 depicting an example of a user 730 with a VR display (e.g. VR goggles) 735 and handheld controller 740 who is viewing a virtual world 755. The user is looking at a location of interest 745 through the client device's display 635, and seeing digital content 750 appearing on the display in that location as if it were any other digital object within that virtual world.

Note that in both FIG. 7A and FIG. 7B, the user only sees digital content that is within a certain proximity to their location, and that which falls within the viewport made available by the viewport of the client device's display 645.

Figure 8A:
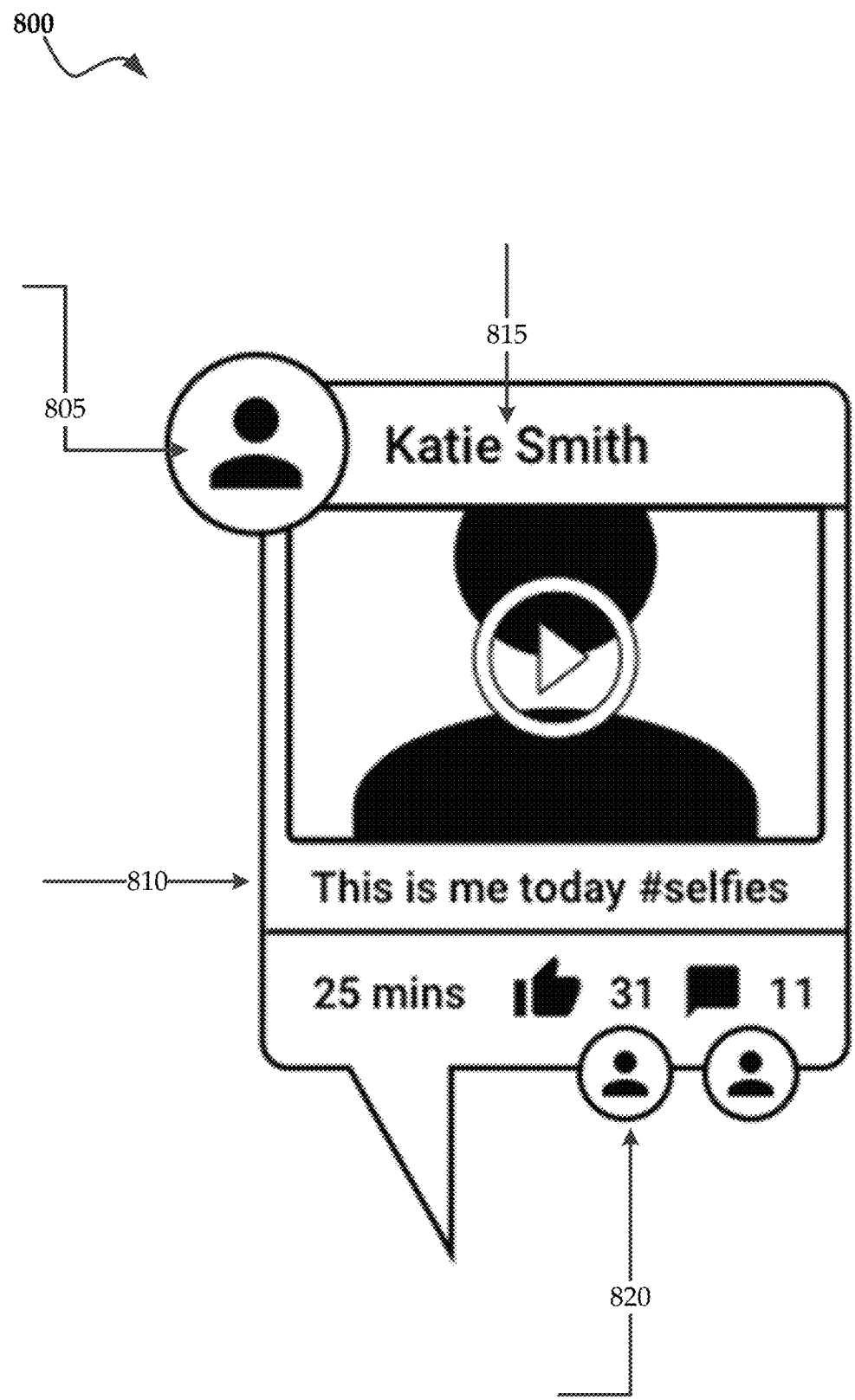
FIG. 8A and FIG. 8B are example illustrations of how Media Tags may be visually represented in an AR or VR environment, including various elements that may be present.
Figure 8B:
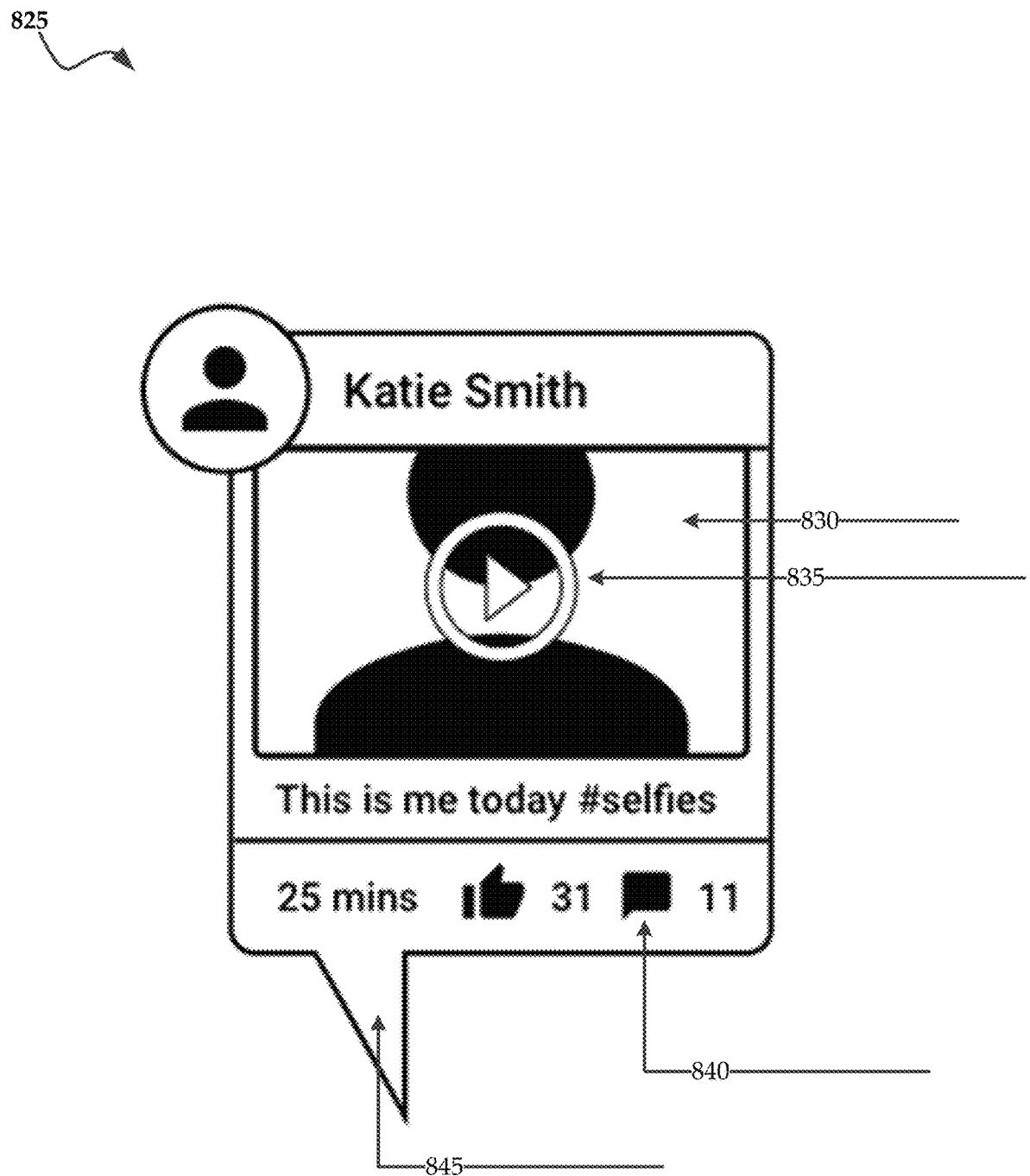

FIG. 8A and FIG. 8B provide examples 800 and 825 respectively of what a Media Tag may look like and the types of visual and/or interactive elements that may be present. This includes, but is not limited to, the following elements depicted in FIG. 8A and FIG. 8B:

Avatar Badge 805 and 820: one or more avatar badges may be attached to the frame to provide an iconic representation of some entity related to the Media Tag. An avatar badge may be used to represent the users who are associated with the Media Tag in some way (e.g. in FIG. 8A avatar badge 805 could represent the author of the Media Tag and the avatar badges 840 could represent other users, each of whom, have added comments or other social media content). An avatar badge may alternatively represent other information (e.g. a fork and knife icon providing a visual cue that the location associated with the Media Tag is that of a restaurant). The user interface for an avatar badge could be interactive such as to provide additional functionality, including but not limited to, allowing the user to access more information or to contact the user represented by the avatar badge. Avatar badges may be grouped to conserve screen space and to avoid obfuscation.

Frame 810: a frame that forms the outer-most visual container for other media tag elements. This visually groups all of the elements and content of a Media Tag.

Title Panel 815: A text field that displays textual information. For example this could contain an appropriate title for the content or for social tags (e.g. this may be the author's social username or handle).

Media Panel 830: a mixed-media panel. Displays the main digital media content which may be, but is not limited to, combinations of: images, text, sound samples, videos, etc.

Multimedia Controls 835: interactive multimedia UI controls 835 may optionally appear if the media panel 820 displays multimedia content. Multimedia content could include, but is not limited to, movies, audio, groups of selectable images, etc.

Social Media Content and Controls 840: an additional area for the display and interactive functionality of social media. This could include, but is not limited to, a text field allowing for the entry of text (e.g. comments, short descriptions, social mentions, etc.), interactive button controls allowing users to "like" or "share" the Media Tag, etc.

Flag Pole 845: a visual indicator at some part of the frame 810 which provides a visual cue to the user as to the exact location to which the Media Tag has been associated with (e.g. a small extrusion in the frame shaped like an arrow such as that depicted in 845).

Distance from viewer: the distance that the Media Tag is from the user currently viewing it (e.g. 350*m* for a restaurant).

Figure 9B:
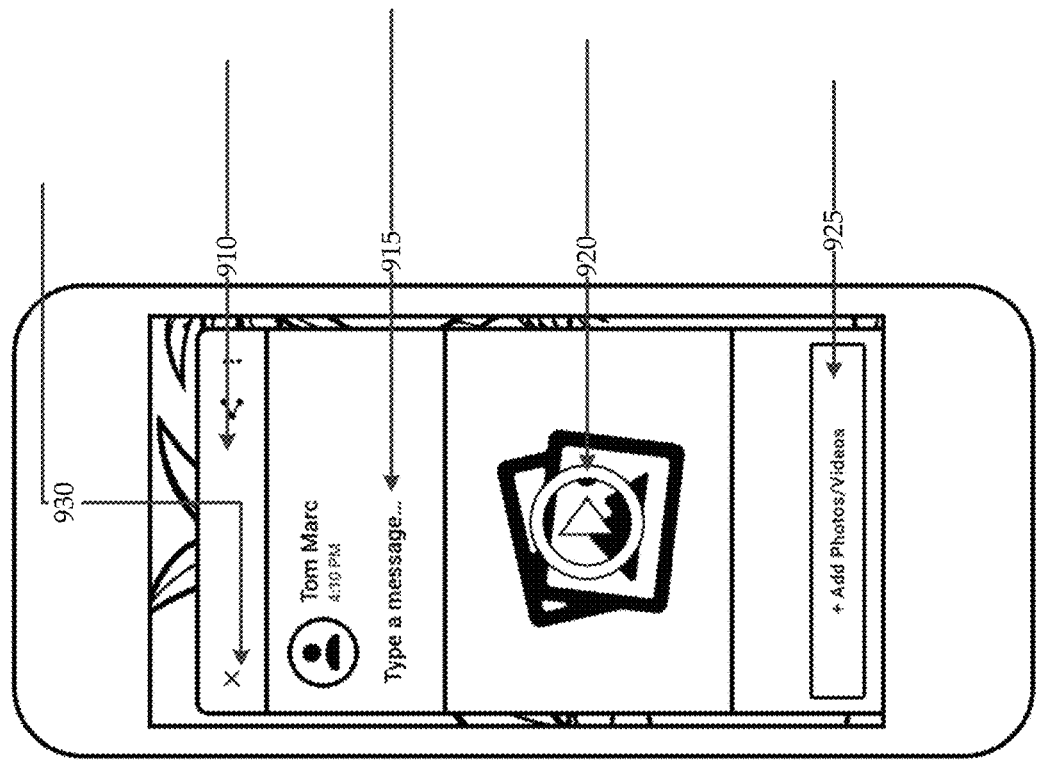
FIG. 9A and FIG. 9B are illustrations of how variations of the same Media Tag may be presented in an AR or VR environment.
Figure 9A:
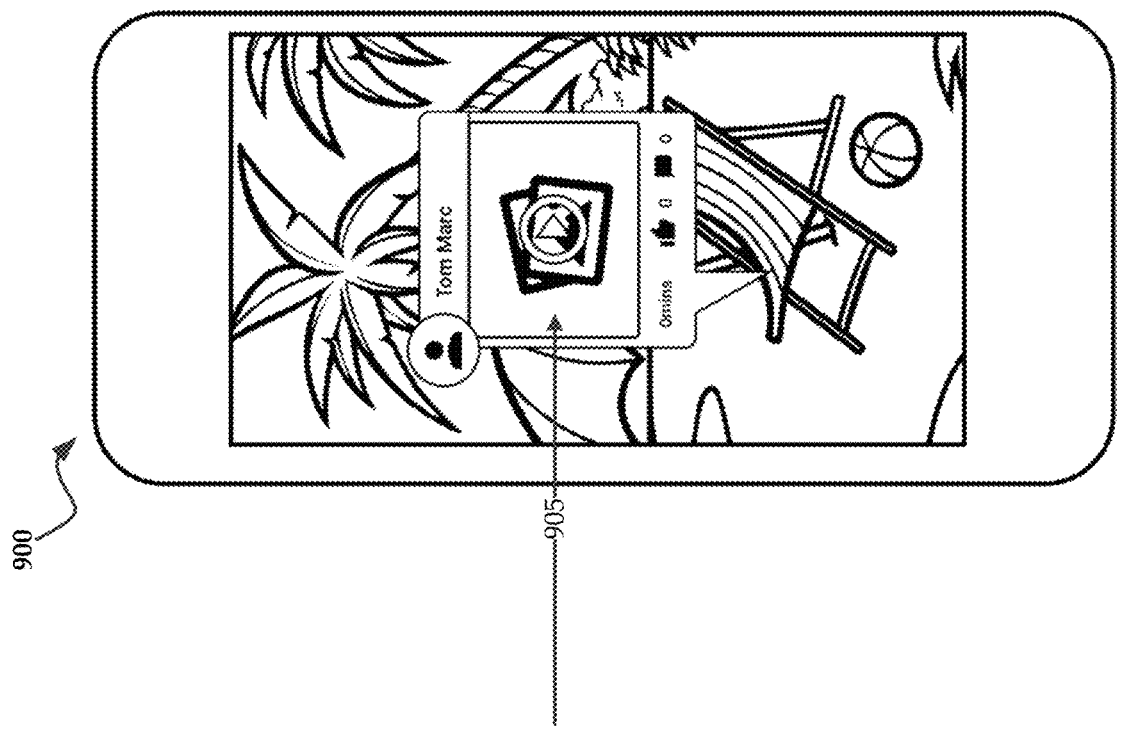

FIG. 9A and FIG. 9B illustrate how a Media Tag may have multiple different views for different purposes (e.g. to provide larger screen elements to enter data such as comments, messages, etc.). The example in 900 shows a Media Tag 905 that has been placed at a location where a digital film was captured. The first Media Tag view 905 provides the user with basic information. Through an appropriate user interface (e.g. tapping on the Media Tag), the user is provided with a secondary view 910 of the Media Tag. In the example of FIG. 9B, the secondary view 910 provides the user with a text field 915 to enter a message, multimedia playback controls 920, and a user interface element 925 to add additional multimedia to the Media Tag. Using an appropriate user interface element (e.g. tapping on the "X" button 930), the user may be able to perform an action such as closing the view.

Figure 10:
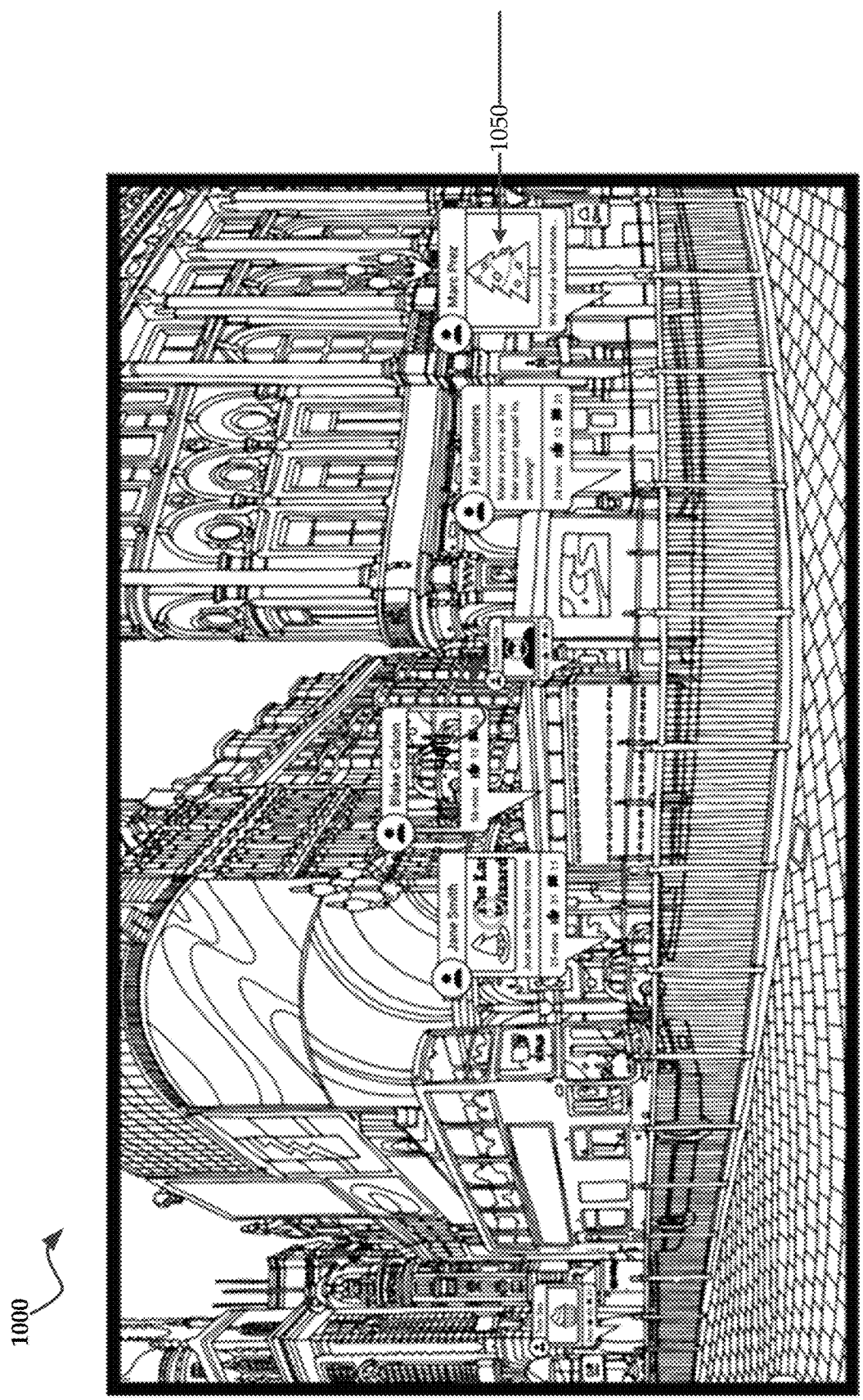
FIG. 10 is an illustration of an exemplary user view of an AR environment with Media Tags present.

FIG. 10 shows an exemplary example 1000 of how Media Tags in an AR environment might be seen by a user in the display 645 of an AR client device 120. 1050 shows an example of a Media Tag that points to a location where a holiday event took place. Amongst the visual elements in the Media Tag 1050 is an image in the media panel 830 showing of the type of food served at that location, and a flag pole 845 indicating the door step of the food establishment's location.

Figure 11:
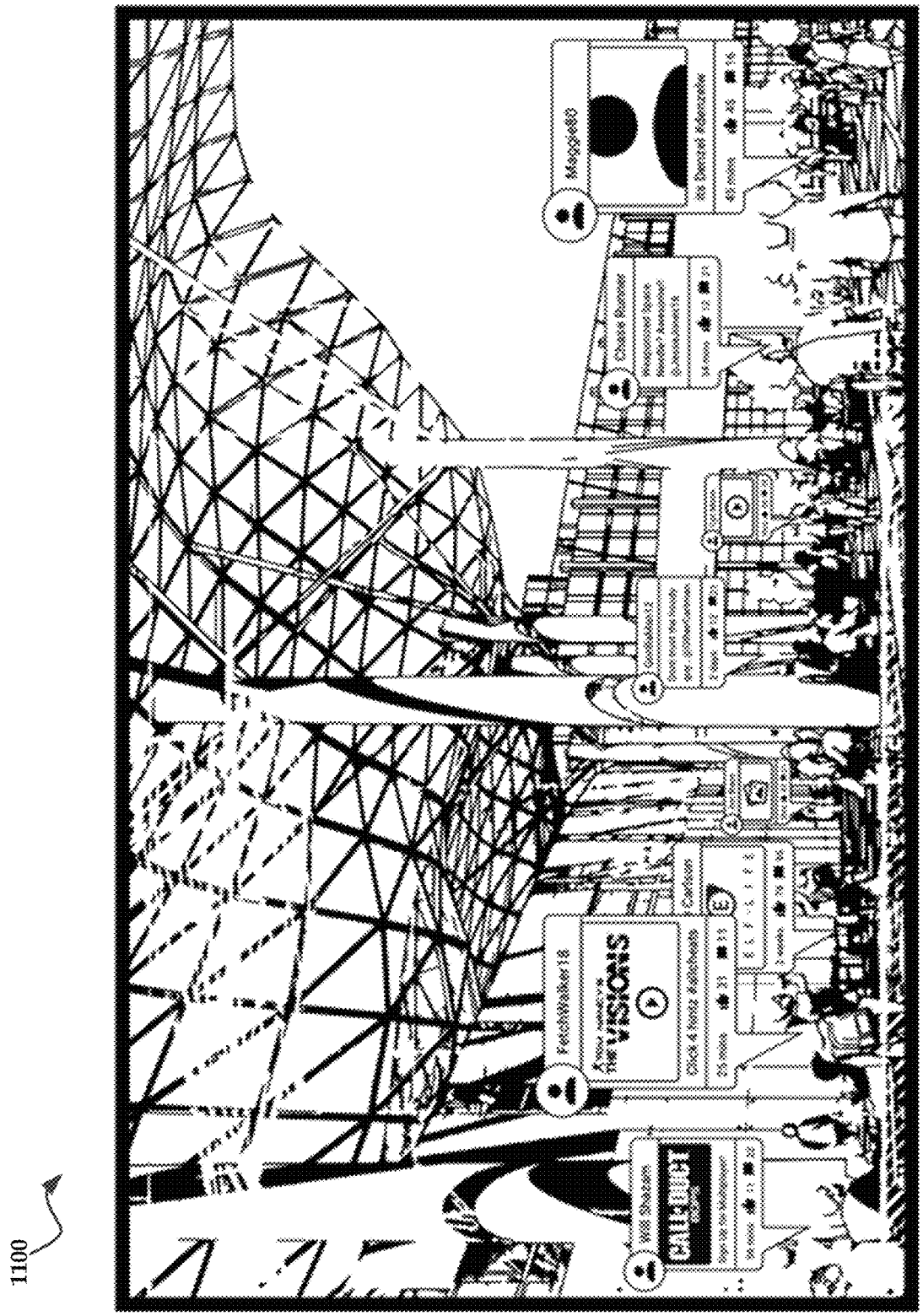
FIG. 11 is an illustration of an exemplary user view of a VR environment with Media Tags present.

FIG. 11 shows an exemplary example 1100 of how Media Tags in a VR environment might be displayed to a user in the display 645 of a VR client device 120.

Figure 12:
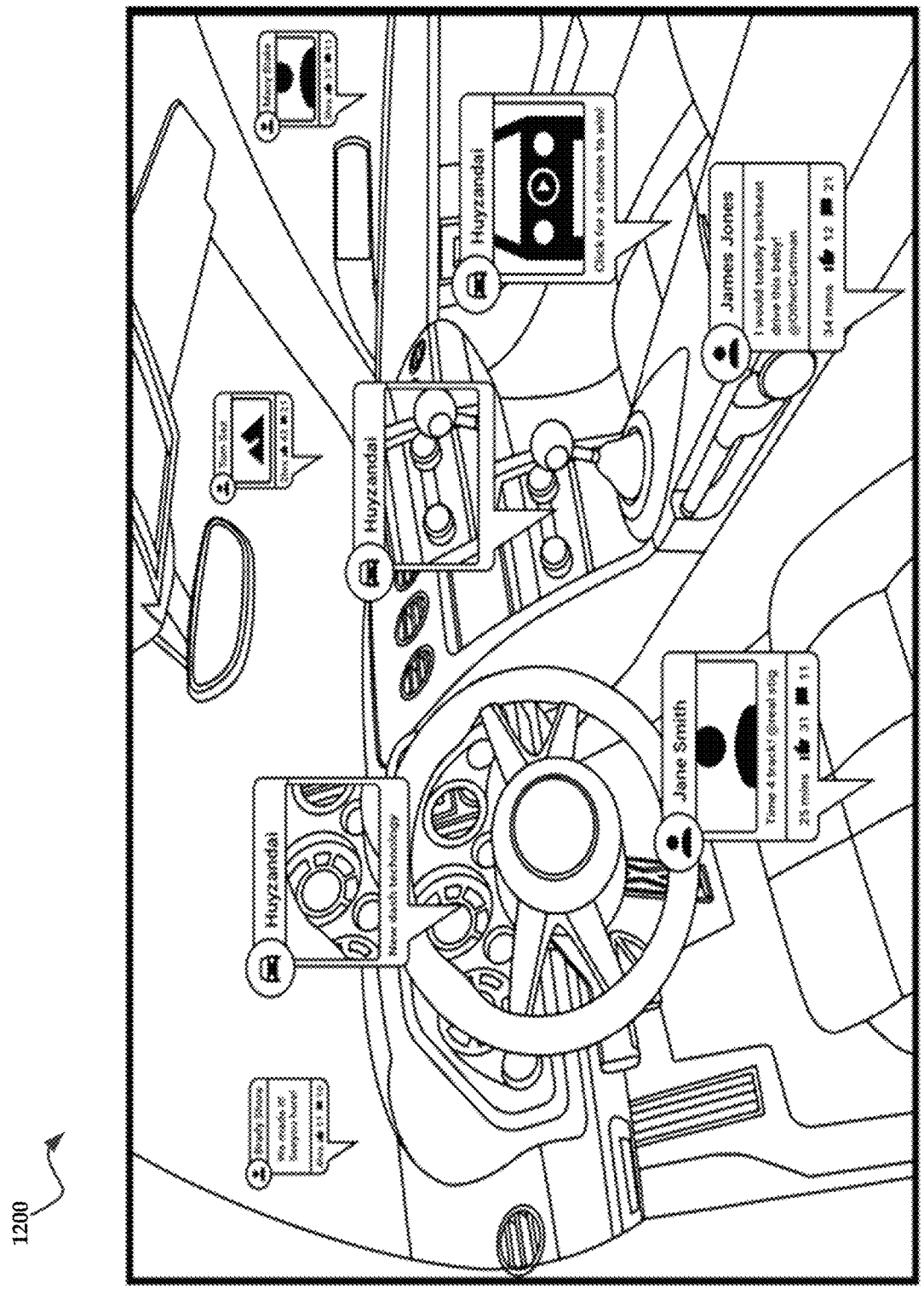
FIG. 12 is an illustration of an exemplary user view of a VR 360° spherical image VR environment or a single frame or multiple Frames of a 360° spherical video VR environment with Media Tags present.

FIG. 12 shows an exemplary example 1200 of how Media Tags in a 360 video or 360/° 180° photosphere image might be displayed to a user.

Figure 13:
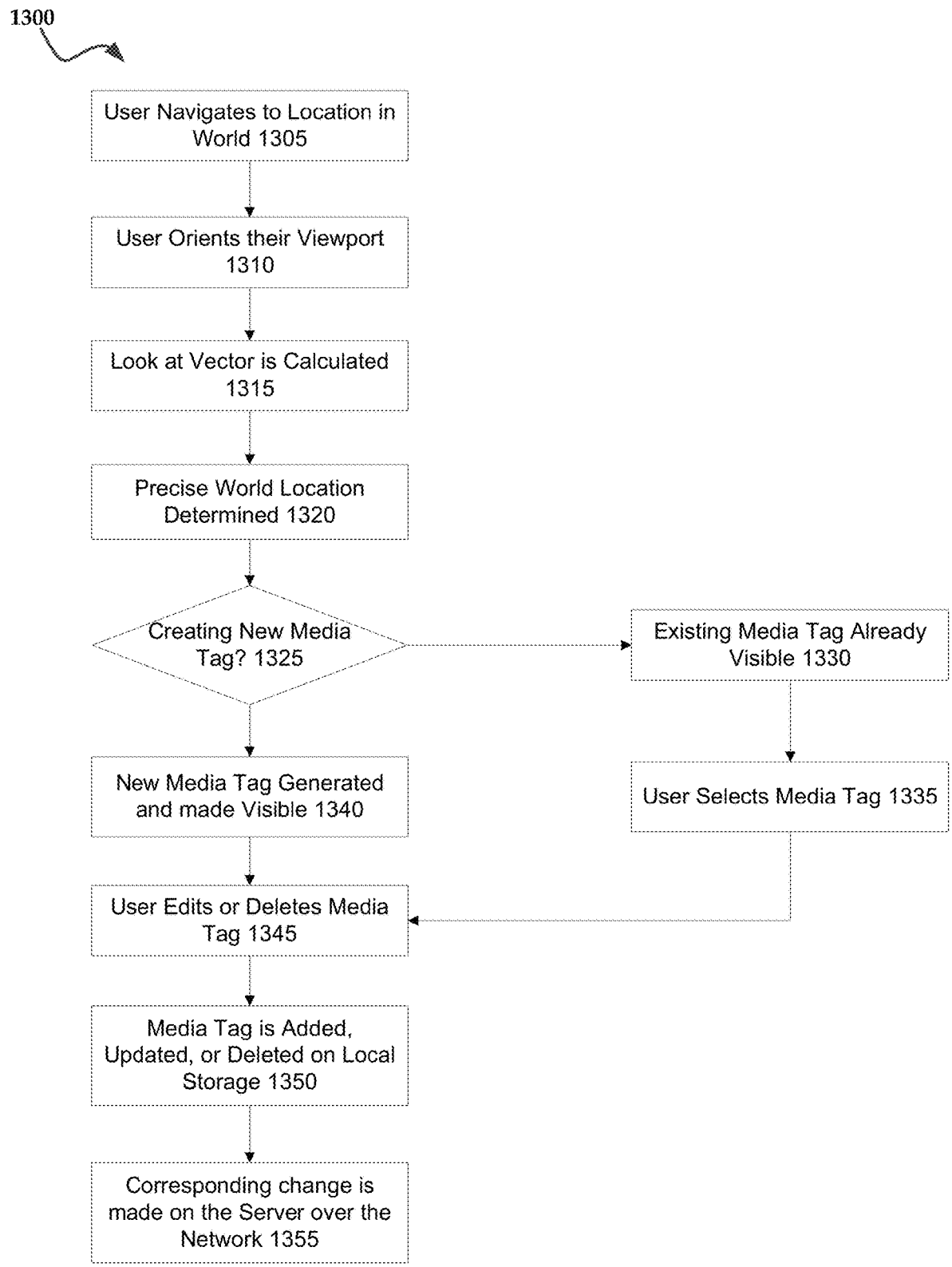
FIG. 13 is a flow chart of an exemplary method for creating, placing, and storing Media Tags in an AR or VR environment.

FIG. 13 provides an exemplary process 1300 for placing digital content in an AR or VR world. A user is navigating in a world 1305 using a client device 120 (e.g. cell phone) which provides a viewport and is executing digital media client software 630. For AR this would be a device augments reality, allowing the placement, authoring, and viewing of Media Tags. For VR the user may be navigating in a virtual world using a device which provides a viewport into that virtual world (e.g. VR goggles) and allows the placement, authoring, and viewing of Media Tags.

The user orients their viewport 1310 and identifies a location of interest on their viewport through appropriate user interface elements. For example, in FIG. 7A a handheld device 710 such as a smart phone provides AR capabilities using the device's onboard camera to provide a viewport, and hardware allowing the user to interact. The user holds the camera up and points it to an object of interest 715 and presses a button to place a new Media Tag 720. Another example is in FIG. 7B where the user is navigating a virtual world using a system which includes VR headset goggles 735 to provide a viewport, and a controller pad 740 with buttons allowing the user to interact. The user presses a button on the interactive controller to place a new Media Tag 750 and a point of interest 745.

A look-at vector 1315 is generated from the position of the user's client device to the location of interest in their viewport. The length of this vector forms this distance between the user's device and their location of interest. This distance may be predetermined via the user's system preferences, or may be determined through some other means.

Using the vector and distance, a precise 3D offset from the user's client device is calculated to determine a precise world location 1320. Additional checks 1325 may optionally be performed to determine if a Media Tag has already been associated with that location 1330 and an appropriate action taken (e.g. preventing the user from adding the new Media Tag at the location). For example, a bounding volume centered about the location of interest may be used to calculate if another Media Tag exists at or very close to the same location.

Otherwise, a new Media Tag is generated and made visible 1340 to the user at the location.

Note: for additional information on placement of Media Tags, and the related calculations for determining precise locations, see U.S. Patent Application Publication 2017/0337745A1 filed on May 19, 2017, titled "Fine-Grain Placement and Viewing of Virtual Objects in Wide-Area Augmented Reality Environments."

The user edits or deletes the content 1345 of the new or existing Media Tag through an appropriate user interface.

The user completes their changes which are then persisted to the client device 1350 and/or on the server 1355 over a network. This data may include the user's world location and calculated offset to the Media Tag, which may be used at a later point to determine if the Media Tag is visible in another user's viewport.

Figure 14A:
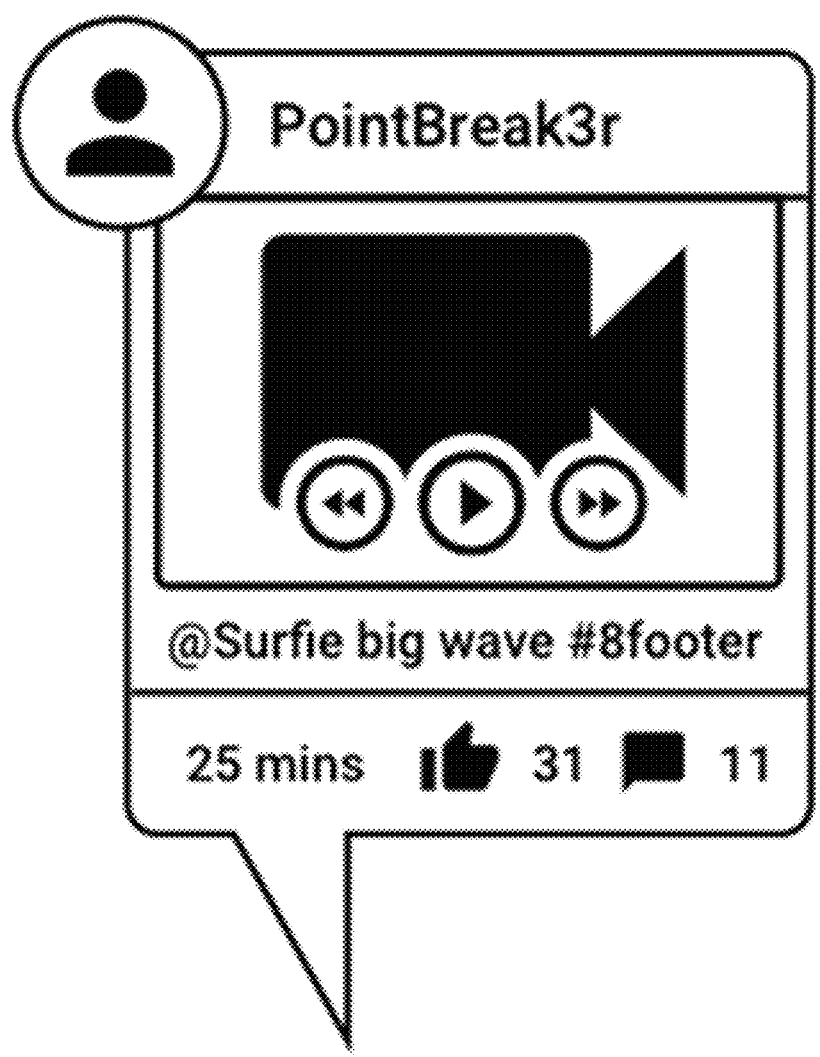
FIG. 14A and FIG. 14B are illustrations of exemplary user interfaces for Media Tags to represent multimedia data (video and audio respectively).
Figure 14B:

FIG. 14A and FIG. 14B depict examples of how Media Tags may appear when associated with multimedia data, namely video and audio data respectively. An icon or the first frame of the video may be displayed in the Media Tag's media panel 830 for video data, while an icon may be displayed in the media panel 830 for audio data.

A new Media Tag which is associated with a video or audio clip may be generated by a user in a process similar, but not limited to, the following list of steps. Note that this process assumes the client device 120 has audio and/or video capture and playback capabilities which can be utilized by the Media Tag system.

The user navigates and then orients their device's viewport such as to point it at an object of interest. A new Media Tag is then generated, associated with that location, and made visible on the user's viewport.

The user invokes an appropriate user interface to start recording content (e.g. video) using an application such as another video recording application.

When the user stops recording, the digital media client software 630 is then resumed.

The Media Tag which is visible on the user's viewport now displays the captured multimedia data in the media panel 830 in some form (e.g. the first frame of video) to indicate to the user that the multimedia data is now associated with the Media tag. The digital media client software 630 may determine what type of multimedia data (e.g. video) is associated with the Media Tag, and determine how it wants to display that visually. For example, icons representing the type of multimedia data associated with the tag may be displayed in the media panel, such as the video and audio icons that are depicted in FIG. 14A and FIG. 14B respectively. Since video data is visual, one of the frames from the video data (e.g. the first frame), may optionally be shown in the media panel 830 instead of an iconic image.

Appropriate multimedia playback controls 835 may also then appear overlaid on the video or audio (such as the multimedia UI controls depicted in the media panel 830 in FIG. 14A and FIG. 14B) allowing a user to playback the multimedia within the Media Pane and/or to hear the audio through the device's speaker system. Since audio data by definition does not contain any visual aspect, a Media Tag may optionally show some sort of animation or other visual indicator during playback to indicate that playback is occurring (e.g. displaying a waveform animation corresponding to the audio data, or a simple static icon).

The user may optionally author additional details of the Media Tag (e.g. add a comment indicating where the video was taken).

The user saves the Media Tag which may subsequently also save the associated multimedia data. This save process may take place automatically, or may be done manually via an appropriate user interface, and may be performed multiple times (e.g. when the multimedia data capture is complete and when adding a comment). Both the Media Tag and multimedia data may be sent over the computer network 110 for storage on the server 105. Since multimedia data such as video and audio can consist of large amounts of data, it may be desirable to cache this data in the local storage 640 on the client device 120. Doing so may improve performance by not requiring the user to download or re download the content from the server 105 each time they want to view it. It may also save on data bandwidth costs for both the user and for the digital media client software 630. Logic may also be implemented to prioritize which multimedia data is cached locally, since local storage 640 may have limited space. For example, a lower priority may be assigned to "least recently used" digital content (i.e. if the cache is full and a new Media Tag is viewed or created, it will evict out other Media Tags and/or associated digital content that hasn't been viewed for the longest time).

Figure 15:
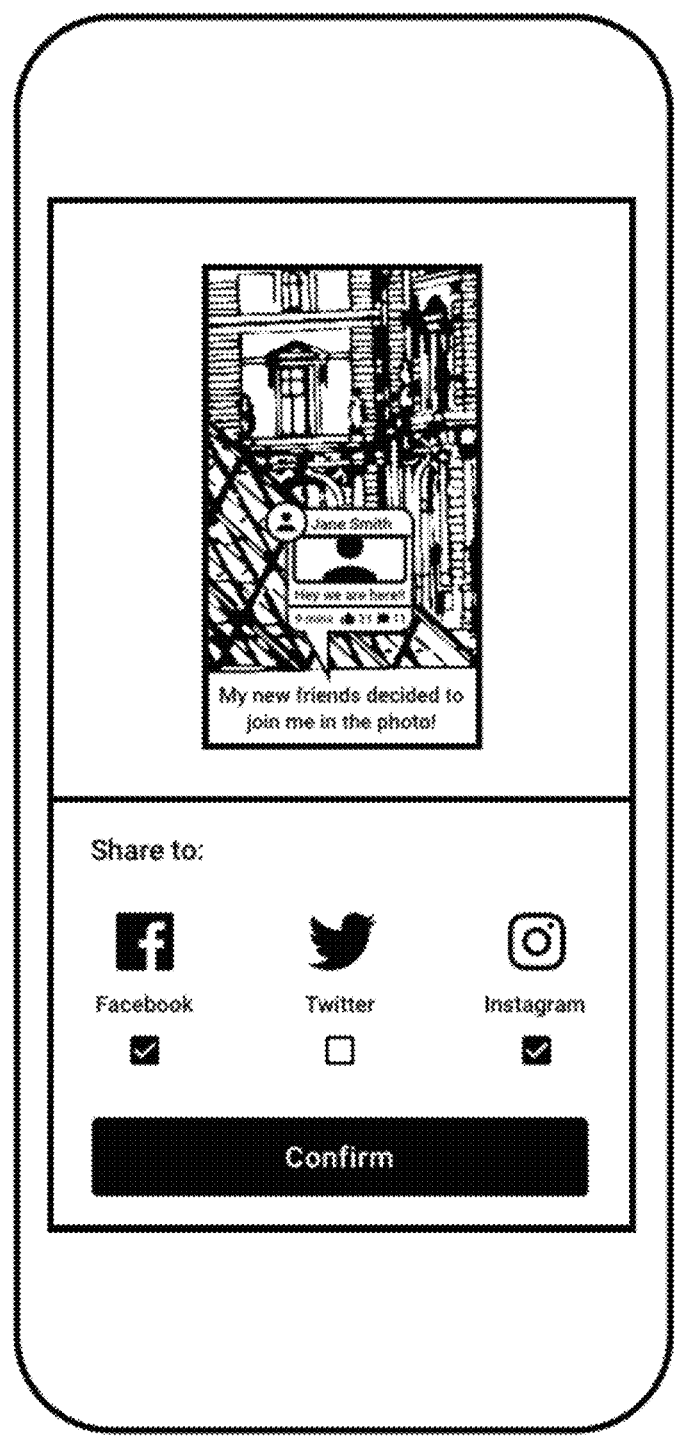
FIG. 15 is an illustration of an exemplary view of a user interface for Media Tags in an AR or VR environment allowing for social media interaction by a user.

FIG. 15 depicts an example of a user interface for sharing any user created Media Tag to social media. Note that Media Tags representing social media data from third party sources may look similar to those created within the digital media client software 630, and may possibly include a small indicator of their source. Media Tag user interfaces which provide social media capabilities, may provide appropriate user interface elements such as, but not limited to:

Comments and text: comments may be entered using a text field within the Media Tag and the text field may include the ability to handle various forms of text including, but not limited to: plain text, HTML, and/or other markup languages. Social media symbols and their associated behavior including, but not limited to: "#" and "@" notation, may also be supported.

Share on other social networks: an appropriate set of user interface elements which may allow users to share the posting on one or more third party social media networks.

Like: an appropriate user interface element that may allow users to like/unlike a Media Tag or some aspect of it.

Rating: an appropriate user interface element that may allow users to rate and/or see a rating for a Media Tag. If multiple users can rate a Media Tag, the underlying system may require a calculation for determining a meaningful rating to show to the user. For example, consider a Media Tag for a restaurant that includes a series of five stars to represent the overall rating provided by thousands of users. In this example, the number of yellow stars provides a visual indication as to the overall rating of that restaurant calculated in some way by using all of the ratings that users associated with that Media Tag (e.g. by averaging out the ratings).

To support social media features for Media Tags, the client side digital media software 630 and/or server side digital media software 600 may require the ability to communicate with both each other and with third party social media networks, and may contain logic to transform social media data associated with a Media Tag, to and from the format supported by those third party social media networks. Such a system may need to do so in a way that makes the data meaningful between the Media Tag and the third party social media networks between which the data is shared.

For example, if a Media Tag is shared on a third party social network, a system supporting Media Tags might need to determine how data associated with the Media Tag is mapped to the types of data supported and/or required by posts on that third party social media network. Conversely, such a system may also need to convert data received from that third party social media network so that it appears in the appropriate locations and format within Media Tag.

Note: common social media features such as likes and ratings for example, may or may not work in conjunction with the respective functionality that is also found on supported third party social media networks with which the Media Tag is associated with. For example, if a Media Tag has been shared on another social media network, a user may choose to "like" it through that social media network's user interface rather than through the corresponding user interface on the Media Tag itself.

The system supporting Media Tag authoring may also need the capability to coordinate updates to the Media Tag, which may occur within the Media Tag's user interface and/or within the social networks on which the Media Tag has been shared. For example, if a user comments on a Media Tag that is represented in another social media network in some way, the system may need some mechanism to be notified about the update and to pull the updated information such that the Media Tag's visual representation may be updated accordingly to reflect that new comment.

Adding, changing, and/or deleting social media data associated with a Media Tag may involve a process similar to the following:

The user orients their device's viewport to an object of interest and invokes an appropriate user interface to create a new Media Tag, or to select an existing Media Tag.

The new Media Tag is created and displayed or an existing tag which was selected by the user may provide a visual indication that it was selected.

The user invokes an appropriate social media user interface control provided within the Media Tag's frame 810. The Media Tag may then display user interface elements appropriate for the type of social media that the user wishes to author. For example, the user clicks a comment button to display a text entry field where comments can be added and viewed.

The user proceeds to perform the social media task represented by that social media user interface control. For example, they may click a "like" button which adds a like to the Media Tag's underlying data and displays a hand icon with a thumb pointing up.

The user completes their social media task. Upon doing so, the data may be stored on the client device 120, the server 105, and/or may be coordinated with other third party social media networks if applicable.

The Media Tag may redraw itself in some way to indicate that the social media task performed by the user is complete. For example, if the user has entered a comment and clicks outside of the Media Tag, the text entry field may become hidden, and the new comment added to the list of existing comments.

Figure 16:
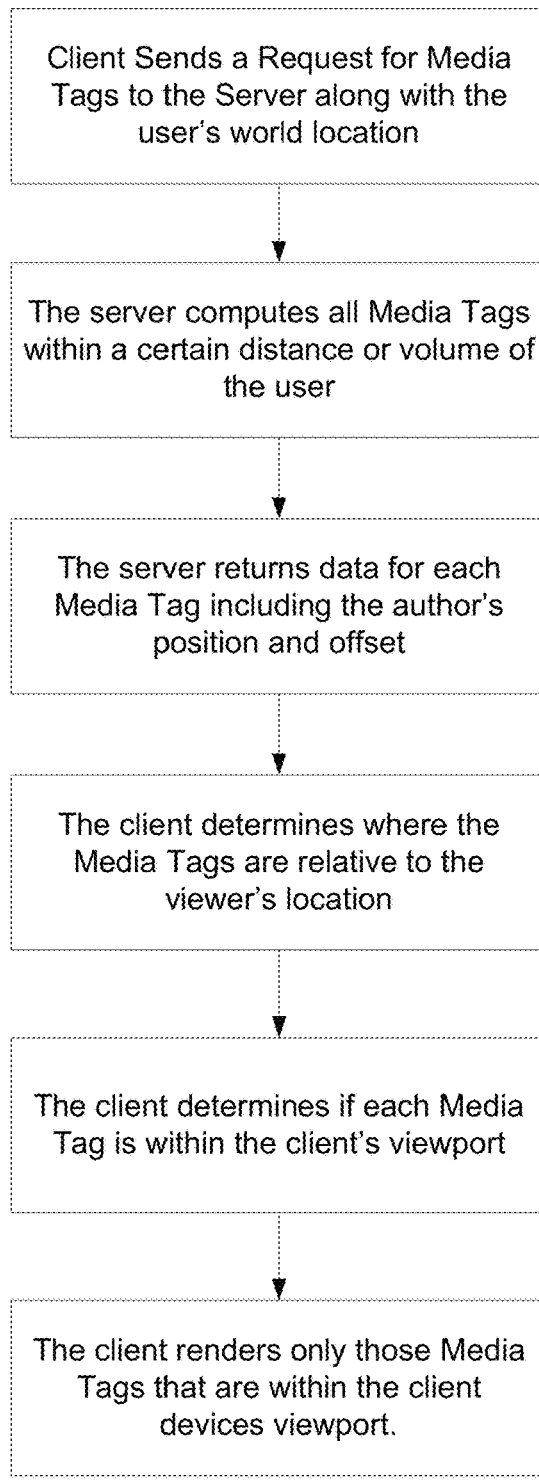
FIG. 16 is a flow chart of an exemplary method for culling of Media Tags involving logic on both the server and client.

FIG. 16 provides a flow chart outlining the exemplary process by which a server 105, given a known location of a client device 120, might follow in order to return potential Media Tags visible to a user As a user navigates the world, their client device sends requests to the server to retrieve all Media Tags that are within a certain distance of the user's world location. The server 105 may use a variety of data and employ a variety of culling techniques to ascertain a proximity or volume from which to return Media Tags. In other words, Media Tags which the user cannot possibly see are culled out. Without limiting the visibility in such a manner, system performance might quickly degenerate if it tried to show all Media Tags when the user can see only those at a maximum viewing distance and within their field of view. In addition, the user's view could become too cluttered if too many Media Tags were to be returned over a network and rendered.

This example process of "server side" culling of objects is described in more detail here:

The client device sends the user's current world location to the server.

The server finds all Media Tags within a radius of that location and returns a collection of data for each Media Tag in that radius. This data may include, but is not limited to: the world position of author when they created the Media Tag and an offset from that location indicating where the Media Tag was placed relative to the author's location.

The client iterates through the list returned and may perform the following:

Calculates the original Media Tag creator's location relative to current origin of the viewer.

Calculates the Media Tag's location relative to the viewer's current origin using the stored offset.

Uses this information along with attributes of the device's viewport to determine where the Media Tag is located relative to the user and their viewport. Note that the viewport of a device can vary based on its physical characteristics as well as user preferences. For example, cellular phone cameras each have different focal lengths, distortions, etc. which may be taken into account when determining a user's viewport. A user may also be provided with the option to set their near/far planes and field of view at the device level, and/or in the digital media client software 630.

If the Media Tag is within the viewport then render it.

Note: by having a server 105 return all Media Tags that are within a radius or volume of the client device, the client device may then cache all of the Media Tags so that they are immediately available for rendering as the user reorients their viewport and/or their position.

As the user navigates the world, their client device repeatedly sends the aforementioned requests to the server to get the potential Media Tags to display. The process of determining when to send these requests may be done using a variety of methods including, but not limited to:

Monitoring how far the user has moved since last requesting a list of Media Tags: after the user has moved a certain distance from the last time such a request was made, a new request may be sent to the server requesting all Media Tags that are within the radius of the user's new location and orientation.

Repeatedly sending requests to the server at certain time intervals (e.g. every minute) requesting that data for a new list of Media Tags be returned for those that are within a radius of the user's current location and orientation.

Repeatedly sending the client device's location to the server, and then having the server notify the client about changes to the Media Tag population at that location.

Figure 17:
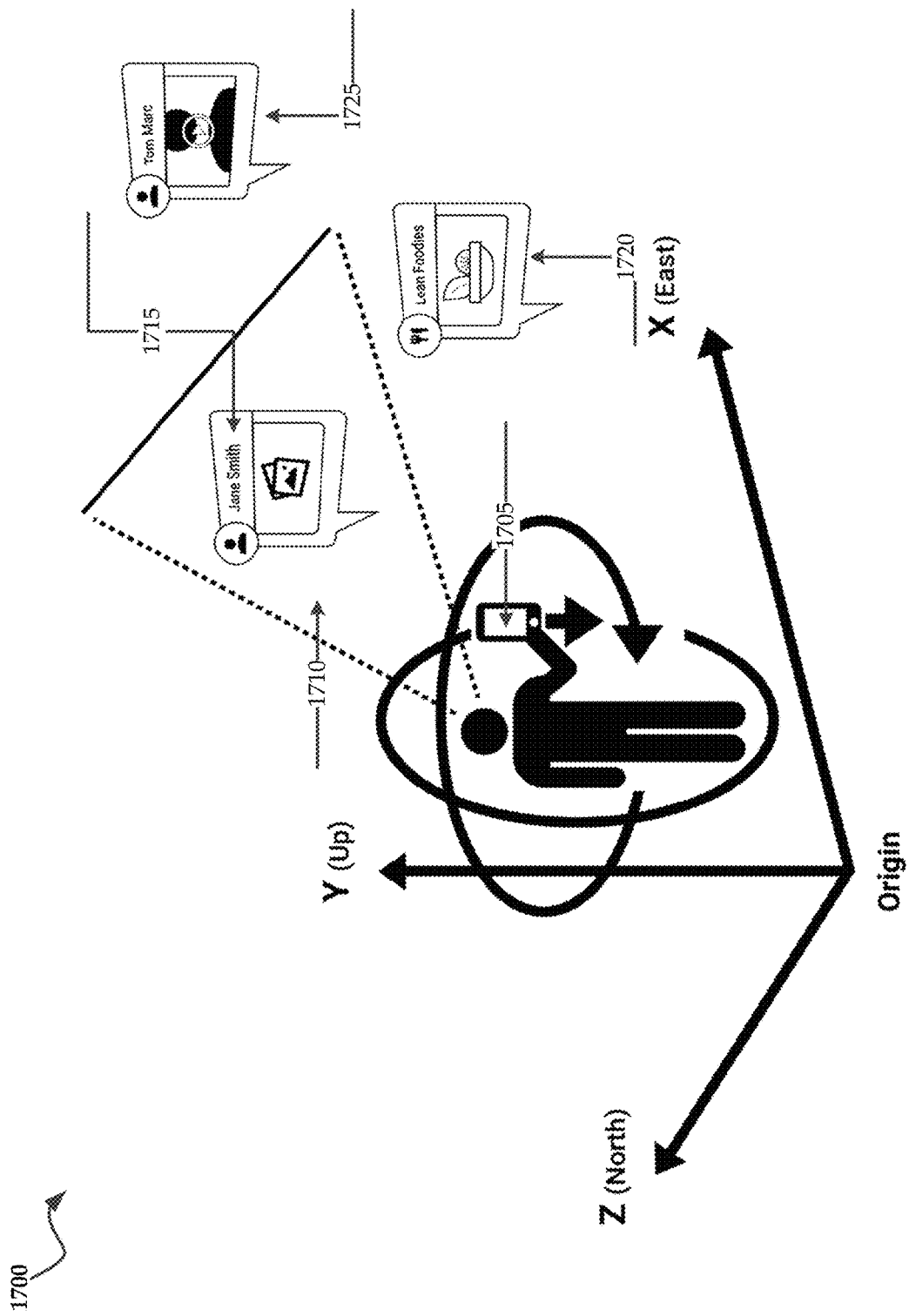
FIG. 17 is an illustration showing the culling of Media Tags that are not within the user's current viewport.

FIG. 17 provides a conceptual diagram 1700 showing how client side culling of the Media Tags returned from a server 105 may be performed. A user's device 1705 provides a viewport 1710 into a world that may define which Media Tags are visible to a user given their orientation. This particular example illustrates the user holding a handheld device 1705 which provides a display of the world (e.g. a smart phone with display screen and camera), but this concept of a viewport may apply to any device the user views their world with, be it AR or VR.

Media Tag 1715 is visible to the user because it lies within the field of view defined by their device's viewport. Conversely, Media Tags 1720 and 1725 are located outside of the field of view defined by the device's viewport and are therefore not currently visible to the user until they navigate close to those objects.

In addition to the server side culling process 1600 and the client side culling process 1700, the visibility of a given Media Tag may also be controlled by settings chosen by the author and/or viewer. These settings would provide a user with additional control over which Media Tag's they would like to see or that are relevant to them. It may also allow them to prioritize which Media Tags are shown, when too many Media Tags are determined to be visible for the user's viewport.

Examples of how these controls may be used include, but are not limited to:

showing or hiding Media Tags available to a large group or those that are publicly available.

showing or hiding Media Tags that are associated with a special interest group that the user is a part of.

prioritizing Media Tags with high levels of activity such as those receiving lots of "likes".

searching/filtering Media Tags using an appropriate user interface, and showing only those Media Tags that have some relevance to the search query.

prioritizing according to the age of the Media Tag (e.g. Media Tags containing only text may remain relevant (e.g. updated by users) over shorter periods than those with images).

prioritizing according to the source of the Media Tags such as whether they've been created by the digital media client software 630, by third party social media sites, or by third party data businesses (e.g. shops displaying specials via Media Tags).

Conversely, such settings may also be used to prevent a sparsely populated world as they navigate. For example, if a new user has just joined the system and wants to see Media Tags as they navigate for the first time, the digital media software on the client device 120 may display all publicly available Media Tags in the user's viewport so that the user can view and experience Media Tags without having to set up any preferences.

Such controls or settings may rely on a permission system that specifies the visibility and allowable actions of Media Tags between remote viewers. With such a system, Media Tags may be subject to viewing, authoring, and/or sharing permissions, or may be publicly available. Data stored and/or utilized by such a system could include, but is not limited to:

user accounts, groups, and/or permissions.

Media Tag actions available to a user and/or for a given Media Tag (e.g. create, edit, delete).

social visibility of a given Media Tag (e.g. publicly visible, visible to a certain group of users, etc.)

data from other third party social media systems.

Note: this information may be stored and/or used by the user's client device 120 and/or by the server 105.

A visible Media Tag may appear to a viewer to be exactly the same as was intended by the Media Tag's author such that oblique viewing angles are possible. Such a Media Tag may be transformed with sheering causing the Media Tags to appear as perspective-correct objects relative the user's position and orientation. The content and all other elements of the Media Tags may also be distorted accordingly.

Figure 18:
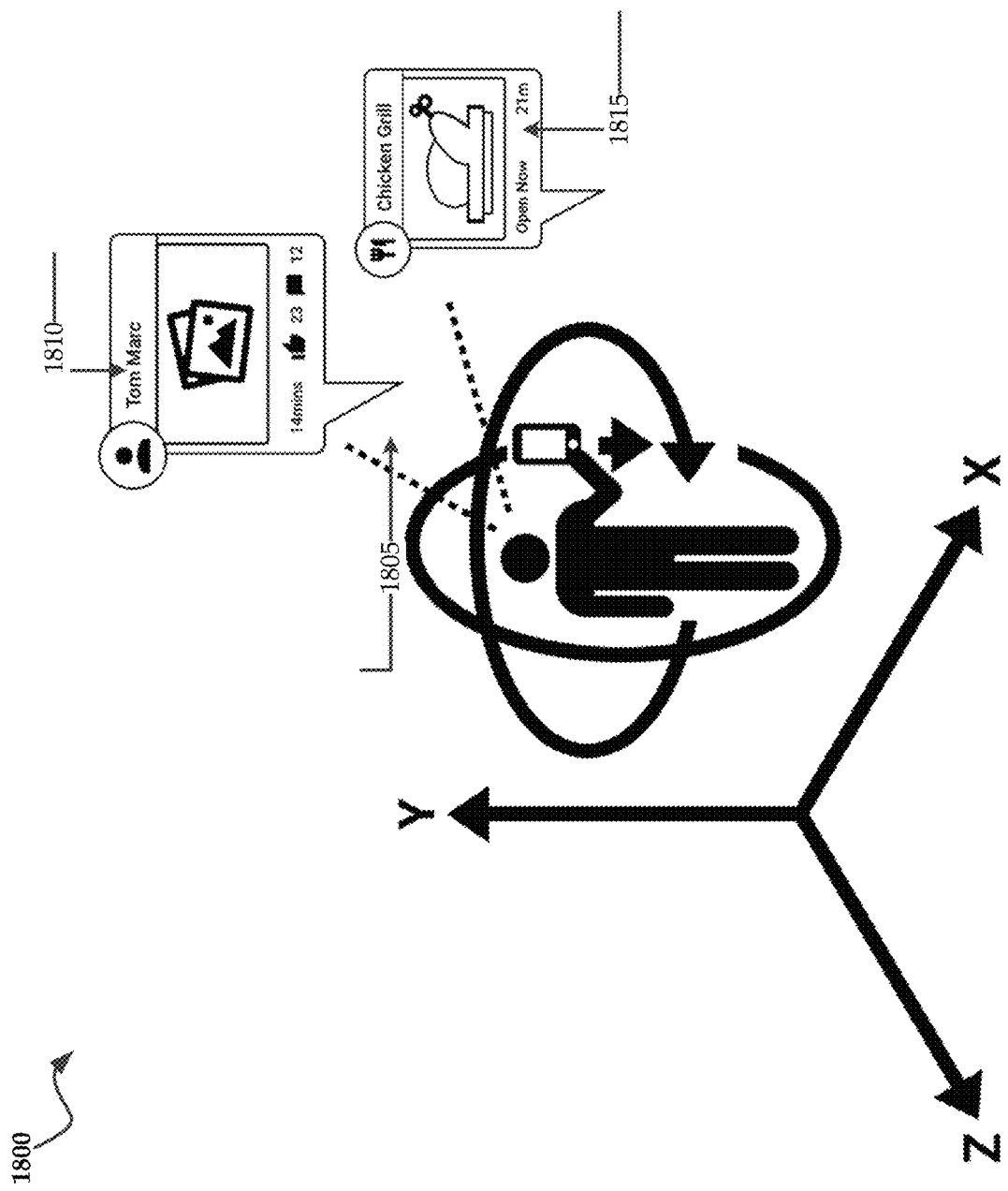
FIG. 18 is an illustration showing how Media Tags in an AR or VR environment may appear in the same orientation to the user, regardless of their viewing angle.

FIG. 18 shows that alternatively, a Media Tag may be configured such that it always faces the viewer. Under this configuration 1800 Media Tags 1810 and 1815 are visible within the client device's viewport 1805 such that they are always perpendicular ("billboarded") to the viewer regardless of the user's position and orientation. These orientation preferences may be set by the Media Tag author and/or any Media Tag viewer, or may be fixed by the system.

Media Tags which lie within a user's viewport may be shown at varying sizes and levels of detail based on their distance from the user. Media Tags that are close to the user may appear with much more detail than those that are further out. As a user navigates closer to or further from a Media Tag, its size may be scaled up or down respectively. A limit may be put in place such that scaling is only increased or decreased to a certain extent so as to prevent Media Tags that are really close from appearing too large, or Media Tags that are too far away from appearing too small. Note that it may be desirable to break the laws of real world perspective and scaling to make Media Tags reduce in size slower as they get farther away so they remain readable for longer.

Scaling or the effect there of, may also be applied to some or all elements of the Media Tag 800/825. This may include, but is not limited to, the following effects on Media Tag elements:

Frame 810, Panels (e.g. 815 etc.), and flag pole 845: the overall size of these elements may increase or decrease in proportion to each other.

Text (e.g. 815): the font point size for the display of any text on the Media Tag may be adjusted up or down as the Media Tag size increases or decreases, to help fit the content in varying sizes of Media Tags. The selected font style and weight may also be adjusted to provide optimal viewing of text at different distances. In addition, the text itself may be truncated so that it is more legible at a given font size. In this case it may be desirable to provide an additional Media Tag view such that the Media Tag can be selected and displayed in a larger size (e.g. full screen) so the user can see the full text.

Multimedia Images and Videos 830: static images and videos may be scaled up or down accordingly.

Visual Controls 835 and Icons 805 and 820: multimedia playback controls (e.g. play button), social media controls (e.g. hand icon for "like"), and avatar badges may also scale up or down as required. Since such elements may be composed of iconic imagery, multiple icons of varying size and/or detail may be selected from, in order to provide an appropriate level of detail for the current size of a Media Tag.

When a new Media Tag is created by a user (the author), it will appear in front of remote users that are near the location of that author. However, the size of that Media Tag will be adjusted based on its relative distance from the remote user. If the author is far away from the other users, the Media Tag will appear smaller than if the author is close to the viewer. Note that Media Tag viewing limits are not necessarily the same as those for human vision but rather what is practically useful is an AR/VR environment.

Varying the size and level of detail of a Media Tag in such a manner allows the user to see an appropriate level of detail based on the proximity from the Media Tag, and reduces the screen space required to display multiple Media Tags which may appear simultaneously within a user's viewport.

For example, Media Tags depicted in FIG. 10 may utilize multiple levels of detail: Media Tags which are close to the user may be shown in full size, while Media Tags which are a bit further out may be represented by more compact renditions. In addition, it may be useful to provide a full screen view of a Media Tag such as that depicted in FIG. 15. A full screen view would effectively provide a 2D stationary form of a Media Tag which has been selected by the user from the 3D world they are navigating. This would allow for benefits including, but not limited to: ample quantities of text to be shown (e.g. comments) and imagery data to be seen in greater detail (e.g. at their maximum size, in a horizontal orientation (e.g. by turning a camera on its side), and at a zoomed in view to see smaller details).

Note: in the case of AR, visualizing data as objects (i.e. Media Tags) in the real world, may require that the rules around representing perspective, size, or orientation of such contrived objects, be altered so that the user can view these objects clearly (e.g. objects may not scale up or down to the same degree that real world objects would, the point size of fonts may only be reduced down to certain minimum, etc.).

Grouping is another technique that may help to optimize the display of multiple Media Tags that simultaneously appear in a user's viewport. Media Tags may be visually grouped together for various reasons which may include, but are not limited to, the following list of examples. Users may then switch between the content by way of appropriate user interface elements.

Media Tags that are spatially close to each other may be grouped together such that content from multiple users can be associated with a single Media Tag.

Media Tags that are of a certain type (e.g. restaurants/cafes/food places, banks/ATMs/financial services, etc.)

Relevance to the user and/or the commonalities they have with the author (e.g. shared interests, shared friends, shared backgrounds (e.g. same school, etc.)).

Proximity to the user, popularity of the place, review ratings, likes/comments, type of establishment, keywords, open/closed status, and any other defining feature.

As a user navigates their world, Media Tags which are visible in their viewports may be selected for editing or deletion. When a user wishes to select an existing Media Tag for update or deletion, an appropriate user interface control may be used to select that Media Tag, and the Media Tag may be redrawn with a visual indicator (e.g. a highlighted Frame) to indicate that the Media Tag has been selected by the user.

Figure 19:
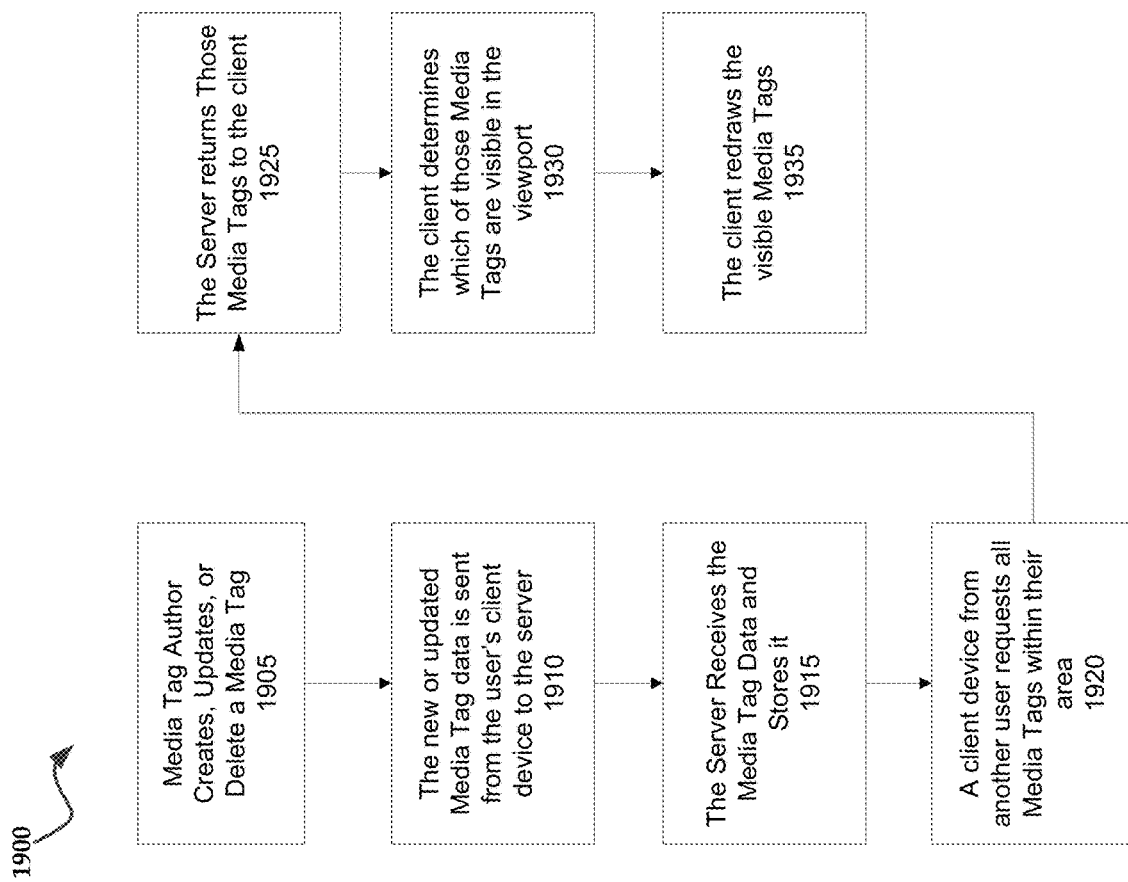
FIG. 19 is a flowchart of an exemplary method for handling changes to Media Tags in an AR or VR environment such that those changes are reflected on the viewports of other users in real time.

FIG. 19 provides an exemplary example process 1900 for handling events when a user creates, updates, or removes a Media Tag, causing the Media Tag to appear, reflect the author's changes, or disappear respectively, in real time, in the viewports of the author and of other remote users nearby.

The Media Tag author starts by creating or changing a Media Tag 1905 after which the client device 120 sends the data 1910 to the server 105. The server then stores the data 1915. The author's client device with digital media software 120 may have a cached view of the change, and so its viewport may re-render the update without having to consult the server 105 for updated information. However, client devices of other users may periodically request Media Tags within their area 1920 from the server, in which case the server may return that Media Tags to the client 1925. Those other client devices then decide if the Media Tags received are within their viewport(s) 1930, and render the updated Media Tags accordingly 1935.

The process of acquiring these updates so that the changes can be rendered on a remote user's viewport, may be accomplished by, but is not limited to, the following techniques:

Notification messages sent over the network: a server calculates all remote users that are located within a certain proximity to the user performing the action on the Media Tag, and who have the ability to see that tag (e.g. it is within their viewport and has not been filtered by some other means). The server 105 then sends a notification message containing the updated Media Tag information to the client device 120 of each user identified. These notification messages cause each viewer to receive the Media Tag data and to have the new or latest content displayed in the Media Tag at the corresponding location, orientation, and size relative to those viewers in real time. A notification message may also indicate that a Media Tag has been deleted, in which case, the client device will no longer render it on screen.

Periodic update requests from the client device: digital media software on a client device 120 may periodically send a request to the server 105 over the network, indicating that it wishes to obtain the latest Media Tag additions, changes, or deletions for Media Tags within a given proximity or within the viewport of the user. These periodic requests may be invoked by the client after a certain time period and/or after a certain distance travelled.

The client device 120 may request, in advance, the Media Tags for a larger region and cache them such that:

Media Tags are viewable in an area to be visited without Internet coverage (offline usage).

mobile data costs can be minimized and speed improved.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
   receiving, from an author client device, an item of digital media created by an author associated with the client device;
   receiving an indication of a social media interaction with the digital media;

placing the digital media and the indication of the social media interaction in a computer graphics environment, the computer graphics environment further comprising visually perceptible elements appearing as real objects placed in a real world setting;

selectively associating the digital media with the real world setting in accordance with a fine grain real world location specified by the author; and providing for viewing at the real world location the digital media and the indication of the social media interaction, wherein a size of the digital media and the indication of the social media interaction are increased as a function of increasing proximity to the real world location.

2. The method of claim 1, the digital media further comprising any of: a text tag, an image tag, a movie tag, an audio tag, a social media tag or a combination thereof.

3. The method of claim 1, further comprising providing for viewing the digital media when at the real world location based on sharing settings specified by the author.

4. The method of claim 1, further comprising storing the digital media on a remote server or caching the digital media on a device of a viewer of the digital media.

5. The method of claim 1, further comprising the digital media having any of: a flag pole, a frame, an avatar badge, a title panel, a media panel, a comments panel or a combination thereof.

6. The method of claim 1, wherein the digital media is placed at the fine grain real world location by way of an augmented-reality interface.

7. The method of claim 1, wherein viewing of the digital media and the indication of the social media interaction when at the real world location occurs by way of an augmented-reality interface.

8. The method of claim 1, further comprising the viewing of the digital media including utilizing data received from a body or body part motion-tracking sensor.

9. The method of claim 1, wherein a level of detail of the digital media and the indication of the social media interaction are increased as a function of increasing proximity to the real world location.

10. The method of claim 1, further comprising:
identifying two or more items of digital media having associated real world locations in spatial proximity to each other; and
associating the identified items of digital media with a single media tag.

11. The method of claim 1, further comprising:
receiving an indication of an update to the item of digital media from the author of the digital media; and
providing for viewing at the real world location the updated item of digital media.

12. The method of claim 1, wherein the digital media is associated with a first media tag and a second media tag and wherein user interaction with the first media tag causes display of the second media tag.

13. The method of claim 1, wherein the digital media and the indication of the social media interaction are provided for viewing at a viewing angle specified by the author of the digital media.

14. The method of claim 1, wherein the digital media and the indication of the social media interaction are providing for viewing at an angle perpendicular to a viewer of the digital media.

15. A non-transitory computer-readable storage medium storing computer-executable instructions that, in response to executing, cause a device comprising a processor to perform operations comprising:
receiving, from an author client device, an item of digital media created by an author associated with the client device;
receiving an indication of a social media interaction with the digital media;
placing the digital media and the indication of the social media interaction in a computer graphics environment, the computer graphics environment further comprising visually perceptible elements appearing as real objects placed in a real world setting;
selectively associating the digital media with the real world setting in accordance with a fine grain real world location specified by the author; and
providing for viewing at the real world location the digital media and the indication of the social media interaction, wherein a size of the digital media and the indication of the social media interaction are increased as a function of increasing proximity to the real world location.

16. The non-transitory computer-readable storage medium of claim 15, wherein the digital media comprises any of: a text tag, an image tag, a movie tag, an audio tag, a social media tag or a combination thereof.

17. The non-transitory computer-readable storage medium of claim 15, wherein the digital media is provided for viewing at the real world location based on sharing settings specified by the author.

18. The non-transitory computer-readable storage medium of claim 15, wherein the digital media has any of: a flag pole, a frame, an avatar badge, a title panel, a media panel, a comments panel or a combination thereof.

19. The non-transitory computer-readable storage medium of claim 15, wherein viewing of the digital media and the indication of the social media interaction when at the real world location occurs by way of an augmented-reality interface.

* * * * *